US012106224B2

(12) United States Patent
Runkler et al.

(10) Patent No.: US 12,106,224 B2
(45) Date of Patent: Oct. 1, 2024

(54) METHOD AND ASSISTANCE SYSTEM FOR ASSISTING THE PLANNING OF AUTOMATION SYSTEMS

(71) Applicant: Siemens Aktiengesellschaft, Munich (DE)

(72) Inventors: Thomas Runkler, Munich (DE); Jürgen Baus, Eggenstein-Leopoldshafen (DE); Michael Rock, Landau (DE)

(73) Assignee: Siemens Aktiengesellschaft, Munich (DE)

( * ) Notice: Subject to any disclaimer, the term of this patent is extended or adjusted under 35 U.S.C. 154(b) by 1268 days.

(21) Appl. No.: 16/423,755

(22) Filed: May 28, 2019

(65) Prior Publication Data
US 2019/0362239 A1   Nov. 28, 2019

(30) Foreign Application Priority Data
May 28, 2018   (EP) .................................... 18174558

(51) Int. Cl.
*G06N 3/088*   (2023.01)
*G06N 3/04*   (2023.01)

(52) U.S. Cl.
CPC ............... *G06N 3/088* (2013.01); *G06N 3/04* (2013.01)

(58) Field of Classification Search
CPC ..................... G06N 3/088; G06N 3/04; G05B 13/0265–0295
See application file for complete search history.

(56) References Cited

U.S. PATENT DOCUMENTS

| 6,529,780 B1 | 3/2003 | Soergel et al. |
| 2008/0262810 A1 | 10/2008 | Moran et al. |

(Continued)

FOREIGN PATENT DOCUMENTS

| CN | 106161209 | 11/2016 |
| CN | 106203624 | 12/2016 |

(Continued)

OTHER PUBLICATIONS

Protopapadakis et al. "Stacked Autoencoders for Outlier Detection in Over-the-Horizon Radar Signals", 2017, Computational Intelligence and Neuroscience.*

(Continued)

*Primary Examiner* — Daniel T Pellett
(74) *Attorney, Agent, or Firm* — Cozen O'Connor

(57) ABSTRACT

An assistance system for assisting the planning of automation systems includes a configuration database that has configuration datasets of automation systems, where a respective configuration dataset in each case has the configuration data of a predefined automation system, includes a vectorization component for structuring and adjusting configuration datasets, where the vectorization component is configured to convert the configuration datasets of the configuration database into vectorized configuration datasets, and includes an AI component for processing the vectorized configuration datasets using artificial intelligence, where the processing of the vectorized configuration datasets by the artificial intelligence (AI) component entails utilization of a neural network that has a deep learning architecture.

26 Claims, 7 Drawing Sheets

(56) References Cited

U.S. PATENT DOCUMENTS

| | | | | |
|---|---|---|---|---|
| 2011/0022192 A1* | 1/2011 | Plache | ............... | G05B 19/4188 |
| | | | | 700/28 |
| 2013/0223207 A1* | 8/2013 | Bouchard | ............... | H04L 47/26 |
| | | | | 370/229 |
| 2014/0337429 A1 | 11/2014 | Asenjo et al. | | |
| 2019/0361409 A1* | 11/2019 | Bettinger | ................ | B21B 37/00 |
| 2020/0272911 A1* | 8/2020 | Quiros Araya | ......... | G06F 16/93 |

FOREIGN PATENT DOCUMENTS

| | | |
|---|---|---|
| CN | 106952193 | 7/2017 |
| DE | 102006056273 | 5/2008 |

OTHER PUBLICATIONS

Chung, Yun-Kung. "A neuro-based expert system for facility layout construction." Journal of Intelligent Manufacturing 10 (1999): 359-385. (Year: 1999).*

Ahmad, Abdul-Rahim, et al. "Automated discovery and utilization of tacit knowledge in facility layout planning and optimization." J. Softw. Syst. Develop (2015). (Year: 2015).*

* cited by examiner

METHOD AND ASSISTANCE SYSTEM FOR ASSISTING THE PLANNING OF AUTOMATION SYSTEMS

BACKGROUND OF THE INVENTION

1. Field of the Invention

The present invention relates to an assistance system for assisting the planning of automation systems, comprising a configuration database comprising configuration datasets of automation systems, where a respective configuration dataset in each case comprises the configuration data of a predefined automation system, and a vectorization component for structuring and adjusting configuration datasets, where the vectorization component is configured to convert the configuration datasets into vectorized configuration datasets.

2. Description of the Related Art

Assistance systems are known from the prior art. By way of example, US Publication No. 2014/0337429 A1 thus discloses, inter alia, a database for storing sets of client data from their automation systems and an analysis component for analyzing these datasets in relation to industry type, application type, used devices and/or configuration settings. To simplify analysis of the industrial data from various sources, the US Publication discloses a normalization component for normalizing the corresponding data before they are stored or analyzed.

One disadvantage of the cited prior art is that different automation systems may have a very different structure, and a direct comparison of various data from the individual systems is therefore difficult. This also, for example, complicates the use of such data when assisting the planning or the configuration of an automation system.

SUMMARY OF THE INVENTION

In view of the foregoing, one object of the present invention is to therefore provide an improved device and/or an improved method for assisting the planning and/or the configuration of automation systems.

This and other objects and advantages are achieved in accordance with the invention by an assistance system which is configured to assist the planning of automation systems and which comprises a configuration database that comprises configuration datasets of automation systems, where a respective configuration dataset in each case comprises the configuration data of a predefined or already known automation system.

The assistance system in accordance with the invention additionally comprises a vectorization component for structuring and adjusting configuration datasets, where the vectorization component is configured to convert the configuration datasets into vectorized configuration datasets. The assistance system additionally comprises an Artificial Intelligence (AI) component for processing the vectorized configuration datasets using artificial intelligence, where processing the vectorized configuration datasets by way of the AI component comprises using a neural network having a deep learning architecture.

By virtue of using artificial intelligence and/or machine learning within the AI component, it is possible to better process and/or analyze the vectorized configuration datasets. In particular using a neural network having a deep learning architecture for this purpose facilitates the processing and/or analysis of the often relatively complex configuration data of an automation system. In particular in order to assist the planning and/or the configuration of an automation system, configuration data of as many different automation systems as possible may advantageously be processed and/or analyzed so as thus, for example, to be able to take into account corresponding data to assist the planning and/or configuration of a new automation system for as many different cases of application of the assistance system as possible. Moreover, the heterogeneity and complexity may become relatively high, in particular during the processing of various configuration data from different automation systems. In this case, the use of artificial intelligence or machine learning using a neural network having a deep learning architecture is advantageous, because deep learning architectures particularly have improved properties in the case of processing and/or analyzing relatively complex data.

An automation system is understood in this case to mean any electronic device and/or data processing device that is configured to control a machine, a device and/or an installation (for example, a production installation). This may be, for example, one or more controllers for the actuators and sensors of the various devices, machines and/or installation parts or of the installation, in particular including the corresponding input/output units for users of the installation and/or of the automation system. Controllers may in this case, for example, be computers or else, for example, what are known as programmable logic controllers (PLC). A controller may in particular be configured as what is known as a modular programmable logic controller. Input/output units may be, for example, corresponding control panels, control terminals or else entire control systems, such as a control and observation system.

An automation system may furthermore also comprise an industrial communication system or corresponding components therefor. An automation system may thus, for example, comprise communication devices for the communication of various components of the automation system, such as what are known as "switches", "routers", "firewalls", and comparable devices and/or network nodes.

The planning and/or the configuration of the automation system may comprise, for example, the selection of components of the automation system and also programming, parameterization and/or configuration of the various components of the automation system. In this case, the planning and/or the configuration of the automation system may also comprise, for example, setting corresponding operating parameters for sensors and actuators connected to the automation system and/or setting various communication parameters (such as network addresses, transmission rates, or communication protocols) for the communication between various components of the individual components of the automation system. The creation of one or more control programs for the components of the automation system may also be part of the planning and/or of the configuration of automation systems.

By way of example, what is known as an "engineering system" may be used for the planning and/or the configuration of the automation system. This may, for example, be designed in the form of software that can be installed on a computer or computer network or comparable data processing devices, which in turn are coupled in terms of communication to the automation system so as to read corresponding data necessary for the configuration or the planning of the system from the automation system or to set or to configure corresponding data in the automation system.

Here, a computer having such an engineering system may be configured, for example, as what is known as a "programming device" for an automation system and/or a controller.

A configuration dataset of an automation system may, for example comprise, all or some of the abovementioned data. By way of example, a configuration dataset in relation to an automation system may comprise parameter data in relation to various hardware components of the automation system. A configuration dataset may furthermore comprise parameters and/or data that are necessary or used to configure and operate the communication between various components of the automation system. In addition, a configuration dataset in relation to an automation system may, for example, comprise data that are used to configure control devices and/or terminals for the automation system, or else comprise data that are used to operate such control devices.

A configuration dataset in relation to an automation system may furthermore comprise one or more control programs for various components or controllers of the automation system. A configuration dataset may furthermore comprise data that are necessary to operate such control programs, such as corresponding databases, program modules, functional modules, program parameter values, conversion tables and/or similar data.

In this case, a configuration dataset may in each case comprise some or all of the data of the abovementioned data categories. In each case, not all of the abovementioned categories have to be present in configuration datasets in relation to various automation systems. In addition, configuration datasets in relation to various automation systems may also at least partly comprise data categories different from the cited data categories. Here a configuration dataset may in this case comprise some or all of the configuration data in relation to a predefined automation system.

If the abovementioned "engineering system" is used for the planning and/or the configuration of the automation system, then what is known as an engineering project may be specified, for example, in order to plan and/or configure a particular automation system, a configuration dataset then in this case being able to comprise data of the engineering project or all of the data of the engineering project. Such an engineering project may also be one possible embodiment for a configuration dataset.

The configuration database may, for example, comprise the configuration datasets that were created, for example, in the past in relation to various automation systems. If an "engineering system", for example, in accordance with the present invention, was used in the context of the planning and/or of the configuration of these automation systems, then the configuration database may be configured, for example, as a database that comprises the correspondingly associated engineering projects. Here, these engineering projects then correspond to the respective configuration datasets. The configuration database may also be configured such that it can be expanded with further configuration datasets of further automation systems at a later time, such that an increasing number of different configuration datasets of different automation systems for processing by the AI component are available to the assistance system as time goes on. The wealth of experience of the assistance system can thus be increased with time, which may further improve the assistance in the planning and/or the configuration of a new automation system.

The vectorization component may be configured such that various configuration datasets are each transformed into a uniform format suitable for processing by the AI component. Such a transformation may, for example, comprise a normalization of values or data, comprise a conversion of values or data, comprise a reformatting of values and data, comprise a comparison of various values and data, comprise an arrangement of particular values and data or comprise comparable structuring and/or adjustment measures.

Here, the vectorization component may, for example, comprise conventional data processing components, or else, at least in part, comprise components of a neural network, or a neural network.

The vectorized configuration dataset is understood to mean the result of the processing of a configuration dataset by the vectorization component. Here, the vectorized configuration dataset may be, for example, in the form of a serial or one-dimensional arrangement or sequence of corresponding values and/or data. A vectorized configuration dataset may furthermore also be a two-dimensional and/or higher-dimensional arrangement of data and/or values or comprise such. Configuration data or parts of the configuration datasets that contain or describe an item of image information or topological information may thus, for example, be configured as a two-dimensional or higher-dimensional part of a vectorized configuration dataset, for example. Furthermore, parameter values for hardware components, program code of control programs or comparable data may, for example, be contained in the vectorized configuration dataset in the form of a one-dimensional or serial arrangement. Here, the arrangement of the data within the vectorized configuration dataset may correspond, for example, to a uniform dimensionality. A vectorized configuration dataset may furthermore also have subsegments of various dimensions.

The conversion of configuration datasets into vectorized configuration datasets by the vectorization component is referred to as vectorization of the configuration datasets in the present invention.

One aim of the vectorization of the configuration datasets is to bring these into a uniform format that is suitable and designed for processing the vectorized data in a neural network.

Here, the vectorization of a configuration dataset may comprise the following measures: (i) normalization of data and/or values; (ii) creation of a numerical representation of data; this may be performed for example by converting text into numerical data, for example by what is known as "text parsing", or else for example by using what are known as "hash functions"; (iii) chaining of ordered data sequences and/or of related data from various sources; (iv) formation of values that describe or combine data (for example formation of averages, determination of a number of data points, noise reduction methods, etc.); and (v) conversion of time series into the frequency domain and/or conversion of frequency series into the time domain.

The vectorization component may, for example, be configured such that it is configured at least to structure and adjust the configuration datasets of the configuration database. Configuration datasets in relation to different automation systems usually each contain at least partly different hardware components, sensors and actuators and are able to provide them for control purposes. As a result, the vectorization component may furthermore be configured such that it can process all of the configuration datasets of the configuration database.

Here, the vectorized configuration datasets may be configured such that they have a uniform data structure. The vectorization component may in particular be configured such that it converts different configuration datasets in relation to different automation systems in each case into vectorized configuration datasets having a uniform data structure. The vectorized configuration datasets can thus be processed reliably by the AI component, because they become better comparable with one another and/or can be processed or can be analyzed in a more uniform manner by virtue of the transformation into the uniform data format.

The AI component is understood to mean a device that is configured to process or treat data using artificial intelligence and/or machine learning methods. The AI component is in particular configured to process the vectorized configuration data using artificial intelligence and/or machine learning methods. To this end, the AI component comprises a neural network, which comprises a deep learning architecture.

A neural network, at least in connection with the present invention, is understood to mean an electronic device that comprises a network of what are known as nodes, each node generally being connected to a plurality of other nodes. The nodes are also referred to, for example, as neurons or units. Here, each node has at least one input connection and one output connection. Input nodes for a neural network are understood to mean those nodes that can receive signals from the outside world (data, stimuli, or patterns). Output nodes of a neural network are understood to mean those nodes that can forward signals, or data to the outside world. What are known as "hidden nodes" are understood to mean those nodes of a neural network that are designed neither as input nodes nor as output nodes.

Generally, a neural network can be trained by determining parameter values for the individual nodes or for their connections using a wide variety of known learning methods by inputting input data into the neural network and analyzing the then corresponding output data from the neural network. A neural network can thus be trained with known data, patterns, stimuli or signals in a manner nowadays known per se, so as then subsequently to be able to use the thus-trained network for the analysis of further data, for example.

A neural network having a deep learning architecture is understood to mean, for example, a neural network having a "deep neural network", a "deep belief network" or a "recurrent neural network".

In this case, what is known as a deep neural network (DNN) may be configured, for example, as a neural network in which the network nodes are arranged in layers (the layers themselves being able to be one-dimensional, two-dimensional or else higher-dimensional). A deep neural network in this case comprises at least one or two what are known as hidden layers, which comprise just nodes that are not input nodes or output nodes. That is, the hidden layers do not have any connection to input signals or output signals.

What is known as "deep learning" is in this case understood to mean, for example, a class of machine learning techniques that utilizes many layers of non-linear information processing for supervised or unsupervised feature extraction and transformation and for pattern analysis and classification.

Furthermore, "deep learning" may also be understood to mean a partial area of machine learning that is based on learning algorithms for a plurality of presentation levels in order to model complex relationships between data. In this case, for example, features and concepts on a higher level may be defined on the basis of terms of lower levels. Such a hierarchy of features may then be referred to, for example, as a "deep learning architecture". The AI component may in this case comprise one or else more neural networks having a deep learning architecture in accordance with the present invention.

Machine learning is understood, for example, to refer to a partial area of information technology that is often used as a synonym for the term "artificial intelligence", so as for example to describe the automated processing of data, for example, from the fields big data, smart assistance systems or planning systems.

The neural network having the deep learning architecture may be configured, for example, as a "deep neural network" (DNN). Here, the structure of the deep neural network may be configured, for example, as a "recurrent neural network". This is a configuration of a deep neural network that is particularly suitable for processing and for classifying sequential input data, such as speech and/or time series.

The DNN may furthermore also be configured with the structure of what is known as a convolution neural network. Such networks are, for example, particularly suitable for processing and for classifying two-dimensional and/or three-dimensional input data, such as images or 3D models.

The deep neural network may also, for example, have what is known as an auto-encoder structure, which is explained in even more detail throughout the course of the present invention. Such an auto-encoder structure may, for example, be suitable for reducing a dimensionality of the data and thus, for example, for recognizing similarities and common features.

A deep neural network may also be configured, for example, as what is known as a classification network, which is particularly suitable for dividing data into categories. Such classification networks are used, for example, in connection with handwriting recognition.

A further possible structure of a neural network having a deep learning architecture may, for example, be the refinement in the form of what is known as a "deep believe network".

A neural network having a deep learning architecture may also have, for example, a combination of a plurality of the abovementioned structures. The deep learning architecture may thus, for example, comprise an auto-encoder structure in order to reduce the dimensionality of the input data, which may then furthermore be combined with another network structure in order, for example, to recognize features and/or anomalies within the data-reduced dimensionality or to classify the data-reduced dimensionality.

In one advantageous embodiment, the neural network may be configured as a trained neural network. In this case, there may in particular be provision for training of the neural network to have been performed at least partly with vectorized configuration datasets taken from the configuration database. The training may in particular also have been performed with all of the configuration datasets stored in the configuration database.

One of the what are known as "supervised learning" methods may be used to train the neural network having the deep learning architecture, for example. Here, through training with corresponding training data, a network is trained on results or capabilities respectively associated with these data. Furthermore, an "unsupervised learning" method may also be used to train the neural network. Such an algorithm, for example, generates, for a given number of inputs, a model that describes the inputs and permits predictions therefrom. In this case, there are, for example, clustering methods via which the data are able to be divided into different categories if they differ from one another, such as through characteristic patterns.

When training a neural network, supervised and unsupervised learning methods may also be combined, for example, if portions of the data are assigned trainable properties or capabilities, whereas this is not the case for another portion of the data.

Furthermore, what are known as "reinforcement learning" methods may also additionally be used to train the neural network, at least inter alia.

When training the neural network with configuration datasets in accordance with the present invention, an unsupervised learning method may preferably be used, because such configuration data, or portions thereof, are often not assigned target values or desired values with which the network could be trained. However, some of the values in a configuration dataset may by all means be considered to be target values or desired values, such as a quality assessment for a configuration dataset. Combinations of unsupervised, supervised and/or reinforcement learning may therefore also be used to train the neural network.

Training the neural network is generally understood to mean that the data with which the neural network is trained are processed in the neural network using one or more training algorithms so as to calculate or to change what are known as bias values ("bias"), weighting values ("weights") and/or transfer functions of the individual nodes of the neural network or of the combinations between in each case two nodes within the neural network.

"Contrastive divergence" methods, what are known as "backwards propagation of errors" methods and/or what are known as "conjugate gradient" methods may be used as training algorithms, for example. The values describing the individual nodes and their connections, including further values describing the neural network, may be stored, for example, in a value set describing the neural network. Such a value set then constitutes a refinement of the neural network, for example. If such a value set is stored following training of the neural network, then a refinement of a trained neural network is thus stored, for example. It is thus possible, for example, to train the neural network with corresponding training data in a first computer system, to then store the corresponding value set that is associated with this neural network and to transfer it, as a refinement of the trained neural network, into a second system. Further data, for example, configuration datasets or vectorized configuration datasets in accordance with the present invention, may then be processed there using this trained neural network.

By way of example, training that requires relatively high computational power of a corresponding computer may be performed on a high-performance system, whereas further tasks or data analyses can then be performed on a lower-performance system using the trained neural network. Such further tasks and/or data analyses using the trained neural network may occur, for example, on an assistance system and/or on a controller, a programmable logic controller or a modular programmable logic controller in accordance with the present invention.

In this case, there may be provision for data of the recommended configuration dataset respectively associated with data of the draft configuration dataset to be output to a user of the assistance system.

This may, for example, be configured such that the user creates a draft configuration dataset for a present automation system in a planning device for an automation system, for example, in an "engineering system" or a "programming device". Here, the draft configuration dataset may also comprise just portions of the data required to configure the automation system. The draft configuration dataset is then converted into a vectorized draft configuration dataset via the vectorization component of the assistance system, and a recommended configuration dataset is thus then determined from the configuration database using the neural network of the assistance system.

By way of example, the corresponding data of the recommended configuration dataset, in each case in relation to particular input data of the draft configuration dataset, may then be displayed on a control surface or user surface, which may be depicted, for example, on a display device of the planning device.

Here, "the corresponding data of the recommended configuration dataset in relation to particular input data of the draft configuration dataset" or "data of the recommended configuration dataset respectively associated with data of the draft configuration dataset" in accordance with the present invention may each be determined, for example, such that these data each belong to one and the same data category and/or one and the same component category or one and the same component type of components of the correspondingly associated automation systems. Here, data categories may be, for example, categories such as network addresses, communication parameters, firmware information, firmware version, information in relation to software modules, component type information and further comparable data categories, such as are usually used in the configuration of automation systems. Component categories or component types may be, for example, types such as a CPU module for a programmable logic controller (PLC), an input/output module or else further modules for a PLC, communication network components (for example, "routers" or "switches"), drives, converters, various sensor types or comparable component categories, such as are usually used in the context of automation systems.

There may furthermore also be provision, in order to determine corresponding or associated data from a draft and recommended configuration dataset, for components of the automation system on which the draft configuration dataset is based to be associated with components of the automation system on which the recommended configuration dataset is based (or else the other way around). The data of the same data type of the individual components respectively associated with one another may then subsequently be used as mutually corresponding data of a draft and recommended configuration dataset within the meaning of the present invention.

Data fields may be provided within a configuration dataset, in which data fields the individual configuration data are stored. These data fields may each be assigned names or addresses using which the configuration data respectively stored there are then, for example, able to be retrieved. A data structure, for example, a hierarchical data structure, may furthermore be provided within a configuration dataset. "The corresponding data of the recommended configuration dataset in relation to particular input data of the draft configuration dataset" or "data of the recommended configuration dataset respectively associated with data of the draft configuration dataset" in accordance with the present invention may then each be determined, for example, such that these data each have an identical or similar internal or external name of the respectively associated data field. Such mutually corresponding data may furthermore also have an identical or comparable position within a data structure, for example, a hierarchical data structure, of the respective configuration dataset or be situated on one and the same hierarchy level.

The possibilities described above for respectively associating data of a recommended configuration dataset with data of a draft configuration dataset may be used on their own or else combined as desired.

Here, the data of the recommended configuration dataset may each, for example, be displayed in the spatial vicinity of the corresponding data of the draft configuration dataset on the user surface of the planning device. By way of example, the data of the recommended configuration dataset may also each be displayed in a selection menu with the corresponding associated data of the draft configuration dataset, such that a user can select, for example, whether he would like to use an originally input item of data or the corresponding item of data from the recommended configuration dataset.

A plurality of recommended configuration datasets in relation to a draft configuration dataset may also be determined by the assistance system. A respective plurality of data from the respective recommended configuration datasets may then accordingly be displayed in the spatial vicinity of a corresponding associated item of data from the draft configuration dataset or else, as likewise described above, in the context of a corresponding selection menu.

A user thus receives assistance when creating the configuration in relation to a particular automation system, in that for example values corresponding to a particular value from the draft configuration dataset for this automation system are displayed or communicated to him by the assistance system, which values have already been used in configuration datasets of corresponding and/or comparable automation systems. This simplifies the configuration of corresponding automation systems, because experiences in configuring other automation systems can thus be utilized.

A deviation from respectively associated data of the recommended configuration dataset in relation to data of the draft configuration dataset may furthermore be output to a user of the assistance system.

In one procedure, for example in a manner comparable to the procedure illustrated above, in this case a user may, for example, be shown, instead of a corresponding value in relation to an item of data from the current draft configuration dataset, not the corresponding value of the recommended configuration dataset but rather a deviation therefrom.

Here, a plurality of recommended configuration datasets may in turn accordingly also be determined by the assistance system, wherein then, in the same way as for the refinement illustrated above, in this case too in each case the various deviations of an item of data from the draft configuration dataset in relation to the respective data of the various recommended configuration datasets are displayed. In this case, the display of these data may also be displayed in the spatial vicinity of the respective item of data of the draft configuration dataset. The display may also again in this case occur in the context of a corresponding selection menu. A deviation may in this case, for example, constitute a difference in the values in the case of numerical values. In the case of alphanumeric values or data, a deviation may correspond, for example, to differences in the corresponding character strings. In the case of image data, deviations may be, for example, differences in the images in the draft configuration dataset and in the recommended configuration dataset or in the recommended configuration datasets.

Using this embodiment, setting up the configuration of an automation system can be simplified further for a user, because differences in the configuration currently created by him in relation to earlier configurations of comparable automation systems are depicted particularly clearly to him. The deviations of the data of the draft configuration dataset or of the draft configuration datasets from the corresponding data of the recommended configuration dataset may also be highlighted in colored form, for example.

Data from the recommended configuration dataset that supplement data of the draft configuration dataset may furthermore also be output to a user of the assistance system.

Here, for example, following determination of a recommended configuration dataset by the assistance system, values may also be output to a user of the assistance system or planning system, which values do not correspond to any of the input data of the draft configuration dataset. This embodiment is useful, for example, in cases in which the user of the assistance system creates a draft configuration dataset in relation to a particular automation system that does not contain all of the necessary or possible configuration data. Here, the assistance system can virtually supplement the draft configuration dataset, for example, using the data of the determined recommended configuration dataset, by outputting configuration data to the user that are expedient and/or needed for the configuration of the current automation system and for which no values had yet been stored in the draft configuration dataset.

This may be configured for example, such that an input mask for inputting various configuration data had been provided in the planning device for the current automation system, which configuration data were partly filled in by the user in the creation of the draft configuration dataset but not completely filled in. Here, the assistance system may then output data of the recommended configuration dataset into corresponding data fields that are still empty. Furthermore, such supplementary data from the recommended configuration dataset may also be displayed in corresponding drop-down menus, selection lists, tables or display windows of a screen surface of a planning device in connection with the input data of the draft configuration dataset.

A user, when planning the configuration of an automation system, thus receives the assistance from the assistance system that is provided to him via data supplementing the refinement illustrated above for the draft configuration data that he has already created. In this case, a plurality of recommended configuration datasets may also be determined by the assistance system, where a respective plurality of data in relation to a particular item of data that has not been input of the draft configuration dataset can then also be output.

The three abovementioned embodiments: outputting respectively associated data of the recommended configuration dataset, outputting a deviation from respectively associated data of the recommended configuration dataset and outputting data from the recommended configuration dataset supplementing the data of the draft configuration dataset, may also be provided in any desired combination with one another as an embodiment of the assistance system.

The assistance system may furthermore be configured such that it is configured to create a result configuration dataset using the draft configuration dataset and recommended configuration dataset. It may furthermore also be configured to determine hardware components associated with the result configuration dataset. The assistance system may furthermore additionally also be designed and configured so as to determine order information associated with these hardware components. As an alternative, the assistance system may also be designed and configured so as to store a result configuration dataset that was determined using the draft configuration dataset and recommended configuration dataset. Here, the associated hardware components may then again be determined or can be determined from the result configuration dataset by the assistance system.

In the context of this embodiment, it becomes possible for a person skilled in the art, for example, to create a result configuration dataset using the assistance system with the draft configuration datasets and the one or more recommended configuration datasets. This may then be, for example, the configuration dataset used for the automation system currently being planned. As an alternative, the assistance system may also be configured so as to store such a recommended configuration dataset. This recommended configuration dataset may then, for example, also have been created in another system, for example a planning device for automation systems.

The assistance system may then, for example, determine the hardware components on which this result configuration dataset is based from this result configuration dataset. These hardware components may then be output to a user, for example. The assistance system may furthermore also determine order information associated with these hardware components, for example, of a particular manufacturer or a plurality of manufacturers. In the case of determining order information of a plurality of different manufacturers, this may then be output accordingly for comparison purposes. As an alternative or in addition, the assistance system may, for example, also be configured to create corresponding order documents for ordering the corresponding hardware components from one or more manufacturers using the determined order information. Here, the assistance system may furthermore also be configured to send the order documents to the respective manufacturers, where the sending can be performed, for example, electronically, using fax or by printing the order documents.

To determine the order information, corresponding databases may, for example, be provided, or corresponding communication components or devices for determining the order information from the Internet or comparable computer networks.

The assistance system can thus be used not only to determine a comparison between a draft configuration currently being formulated and one or more recommended configurations of comparable automation systems, but rather also furthermore hardware components used in the process and their order information. An order for the hardware components may possibly then additionally even be prepared and/or placed.

The result configuration dataset may also be created, for example, at least partly using manual user indications. These may consist, for example, of a selection of particular configuration values from the draft configuration dataset and/or the one or more recommended configuration datasets, or else of the manual inputting of further data. The result configuration dataset may also be created by the assistance system without further user inputs. This may occur, for example, such that the draft configuration data input by a user are used for particular configuration data, and the corresponding values of a recommended configuration dataset are used for configuration data not manually input by a user.

There may furthermore be provision for configuration datasets of the configuration database to each be assigned at least one assessment characteristic variable, and for a recommended assessment assigned to the recommended configuration dataset to be output to a user of the assistance system. Here, the recommended assessment may be derived, for example, from the assessment characteristic variable or be derived from the assessment characteristic variable by the assistance system. By way of example, the recommended assessment may, however, also directly correspond to the assessment characteristic variable.

The assessment characteristic variable may be, for example, a variable characteristic of a quality of a configuration dataset of the configuration database, a characteristic value and/or a characteristic description. The characteristic variable may be, for example, a numerical value or an alphanumeric character string or description or quality description. By way of example, an assessment characteristic variable may be a running time of a project or automation system associated with a configuration dataset, in which the configuration was used in unchanged form. The assessment characteristic variable may also be, for example, an assessment input by a user, such as a satisfaction assessment or quality assessment.

Here, the assistance system may, for example, be configured such that the one or more assessment characteristic variables are also part of the configuration dataset and are accordingly also vectorized when the configuration dataset is vectorized, and are thus virtually "jointly learnt" by the neural network of the assistance system. As an alternative, the one or more assessment characteristic variables may also be stored separately and associated with a particular configuration dataset by way of a particular identification or ID, for example, such that in the identification of a configuration dataset of the configuration database as recommended configuration dataset, the corresponding assessment characteristic variable or the assessment characteristic variables are then able to be determined or are determined by way of the corresponding identification or ID.

In one advantageous embodiment, the neural network may have what is known as an "auto-encoder" structure. Here, the auto-encoder structure may have, for example, an encoding region, a code region coupled thereto and a decoding region connected to this code region.

An auto-encoder may be the name given, for example, to such a neural network that is trained or can be trained to reproduce the data input into the neural network at the output of the neural network again, or at least to approximately reproduce them. Here, it may be, for example, a field of use or purpose of an auto-encoder to reduce the amount of data characteristic of a particular dataset, and thus to achieve a more characteristic description or better characterization of these data. Such a dimension reduction may, for example, be achieved by the number of nodes within the code region already described above being lower than that of the encoding and decoding regions of the auto-encoder. Here, the training methods for an auto-encoder may then, for example, be configured such that the parameters of the individual nodes and node connections of the auto-encoder (for example, bias, weighting ("weight") and/or transfer functions) are configured such that the input data are reproduced again at the output of the auto-encoder, or at least approximately reproduced. This is one example of what is known as unsupervised learning.

The encoding, code and/or decoding region may comprise one or more layers of nodes. Here, a node layer may be configured, for example, so as to be one-dimensional, two-dimensional or higher-dimensional. Nodes of a particular node layer may typically not be connected to one another but can, however, be connected to one, several or else all nodes of a previous and/or following node layer.

The abovementioned dimension reduction may be then achieved in the case of an auto-encoder constructed from node layers, for example, such that the number of nodes within a code node layer is smaller than that of the individual encoding and decoding node layers of the auto-encoder.

Advantageously, the first one of the encoding node layers that are present is connected to the inputs of the neural network, and the last one of the decoding layers is connected to the outputs of the neural network. Again advantageously, the auto-encoder may be configured such that the first one of the encoding layers has the same structure as the last one of the decoding layers. Again advantageously, the number of encoding layers corresponds to the number of decoding layers. The auto-encoder may furthermore also be constructed so as to be symmetrical, where the auto-encoder in this case may be configured, for example, so as to be symmetrical in relation to the code node layer and/or the code region. Symmetry may in this case preferably relate only to the arrangement of the individual nodes and their connections, and not to their respective parameters (for example, bias, weights, or transfer functions).

By way of example, the auto-encoder may also be configured as a "deep auto-encoder", in which the encoding region and/or the decoding region has a plurality of node layers. Here, those node layers of the encoding region that are not connected to the input of the neural network and those layers of the decoding region that are not connected to the output of the neural network are referred to as what are known as "hidden layers".

In a further advantageous embodiment, the number of nodes of the code layer of the auto-encoder structure is smaller than the number of nodes of the layers of the encoding region and of the decoding region.

The neural network is advantageously configured with the auto-encoder structure as a trained neural network, where the neural network in this case may have been trained, for example, with several or all configuration datasets of the configuration database.

The auto-encoder structure may furthermore be configured such that a location in the code region of the neural network is assigned or can be assigned to a configuration dataset of the configuration database. The location in the code region may be understood to mean, for example, that the location is described, for example, by the position and, for example, also the parameter values of those network nodes that are activated when the corresponding configuration dataset is input into the neural network at the input of the neural network.

A location may in this case be assigned such that, after inputting a vectorized configuration dataset into the auto-encoder structure, one or more nodes in a code layer and/or the code region of the auto-encoder structure are activated. If, for example, only one node is activated in this case, then this node may constitute a location assigned to the configuration dataset. If, for example, a plurality of network nodes are activated, then a location may be formed, for example, as a focal point, a geometric or spatial center, a geometric or spatial center weighted with activation characteristic values or a similar characteristic spatial region.

Thus, for example, for a neural network having an auto-encoder structure in accordance with the present invention, a location in the code region of the auto-encoder structure of the neural network may be assigned to configuration datasets of the configuration database, advantageously to each configuration dataset of the configuration database. To this end, each of the configuration datasets is input at the input of the neural network and, to this end, the location determined in the code region is then recorded and stored. This gives a location in the code region of the auto-encoder structure of the neural network for each of said configuration datasets. In this case, the neural network is in this case advantageously configured as a trained neural network having a trained auto-encoder.

These determined locations may then furthermore be analyzed for example, where neighborhood relationships between the locations may, for example, be able to be interpreted as similarities in the context of the underlying configuration data.

The locations in the code region may furthermore, for example, be investigated by way of clustering methods (for example, using what is known as the "K-means clustering" method). Configuration datasets may thus, for example, be divided into various characteristic groups. In this case, a group of configuration datasets has a correspondence, for example, with each of those whose location in the code region of the auto-encoder of the neural network lies within a cluster.

In general, in this case configuration datasets, before being input into the neural network, are converted into vectorized configuration datasets in accordance with the present invention, even when this is not always explicitly mentioned as such in the context of the present invention.

A draft location in the code region of the auto-encoder structure of the neural network may thus, for example, be determined for the draft configuration dataset, where the recommended configuration dataset is furthermore able to be determined from the configuration database using corresponding locations of the configuration datasets from the configuration database.

In this case, the recommended configuration dataset may be determined, for example, such that several or all of the configuration datasets of the configuration database are already assigned locations in the code region of the auto-encoder structure of the neural network. The draft configuration dataset is then converted into a vectorized draft configuration dataset and input into the neural network. The location of this configuration dataset in the code region of the auto-encoder structure of the neural network is then determined, where the location then constitutes the draft location. Here, the draft configuration dataset may, for example, be configured in accordance with the present invention.

If the draft location is known, it is then subsequently possible, for example, to determine a distance between the draft location and various previously determined locations of configuration datasets of the configuration database. In this case, the distance may, for example, be determined by determining the number of nodes that lie between the draft location and the respective location of a configuration dataset or determining a minimum number of nodes that lie between the draft location and the respective location of a corresponding configuration dataset. The distance may also furthermore be formed as a geometric distance in a one-dimensional, two-dimensional or else three-dimensional depiction of the code region of the auto-encoder structure of the neural network.

A location, nearest the draft location, of a particular configuration dataset from the configuration database may then subsequently, for example, be determined. The associated configuration dataset may then be selected, for example, as a recommended configuration dataset and, for example, then be output to a user or be transmitted to a corresponding planning system or engineering system in accordance with the present invention. A plurality of locations, nearest the draft locations, of configuration datasets may furthermore also be determined, such as a predefined number of nearest locations, or all locations that lie below a predefined or predefinable distance threshold. The configuration datasets respectively assigned to these locations may then in turn be recorded as recommended configuration datasets and possibly output and/or transmitted to a user or a planning device or an engineering system in accordance with the present invention.

There may furthermore be provision for locations that are assigned to configuration datasets of the configuration database in the code region of the neural network to furthermore be assigned to at least one cluster region. The assistance system may additionally be configured such that it is configured so as to determine a cluster standard configuration dataset from configuration datasets assigned to a cluster region.

In this case, there may, for example, be provision for some or all of the configuration datasets of the configuration database to be respectively assigned to at least one cluster region. Cluster regions may be determined, for example, such that, for the already determined locations of configuration datasets in the code region of the auto-encoder structure of the neural network, by way of a cluster algorithm (for example, the "K-means clustering" algorithm), corresponding clusters of locations in relation to configuration datasets in the code region of the auto-encoder are found, and these are then, for example, assigned cluster regions corresponding to this cluster algorithm.

These cluster regions may, for example, be assigned technical fields, application fields, applications, installation categories and/or comparable categorizations of production and/or automation systems, for example, by a user or an appropriate algorithm. By way of example, a configuration dataset may thus be assigned one or more such categories or be contained therein. Here, for example, a cluster region may be assigned a category that corresponds to a plurality of the corresponding categories of the configuration datasets of this cluster.

A cluster standard configuration dataset may be determined, for example, such that it is determined, from the number of configuration datasets, which ones have a location in the associated region of this cluster. Different configuration datasets may thus, for example, be assigned assessments in accordance with the present invention, and that one of the configuration datasets of the cluster region that has the best assessment can be selected as cluster standard configuration dataset. Furthermore, several or all of the configuration datasets that are associated with the cluster may also be selected, where some of the values of the cluster standard configuration dataset are formed as average values of individual data of the respectively selected configuration datasets. In one advantageous embodiment, these methods may also be combined, where, in the case of some of the data, the corresponding item of data from the configuration dataset with the best assessment in the cluster standard configuration dataset can be used, whereas, in the case of other values, an average value or best value created using any desired method may be applied.

In this case, one or more cluster regions may be provided. Furthermore, not all of the known locations of configuration datasets in the code region of the auto-encoder structure of the neural network have to be assigned to a cluster region. The cluster standard configuration datasets may then furthermore be stored as "templates" and can possibly be made available to users. In the case that one or more categories are assigned to a cluster region, then these categories may likewise be assigned to the cluster standard configuration dataset. A user could then be provided, for example, after indicating a particular category, with a corresponding template for a configuration dataset.

In one advantageous embodiment, at least one of the configuration datasets of the configuration database and/or the draft configuration dataset comprises hardware data in relation to hardware devices of the associated automation system. Furthermore, in this case, the vectorization component may comprise a hardware data vectorization module for structuring and adjusting the hardware data.

Hardware devices may be, for example, assemblies for controllers, peripheral devices, modules for controllers and communication, network components, computing devices, sensors, actuators or further comparable hardware devices, as are normally used in automation systems. Corresponding hardware data may be, for example, identifiers for such hardware components, parameters of such hardware components, such as network addresses, port numbers, power ranges, property identifiers or properties, available network protocols, component or state identifiers, location information, compatibility information and comparable information, which are normally necessary or used or can be used in automation systems to configure and/or characterize hardware components used therein. By way of example, hardware data in relation to hardware devices of an automation system may be what are known as hardware configuration data within as an "engineering system" for automation systems.

Furthermore, at least one of the configuration datasets of the configuration database and/or the draft configuration dataset may comprise communication data in relation to the communication within the associated automation system. Furthermore, the vectorization component may comprise a communication data vectorization module for structuring and adjusting the communication data.

Communication data in relation to the communication within an automation system may be or comprise, for example, information about one or more communication protocols that are used, information about one or more communication parameters (for example, data formats and/or packet formats, transmission rates, coding that is used), an item of information about one or more communication protocol types (for example, whether time-controlled and/or event-controlled data transmission is present). Communication data may furthermore also, for example, be or comprise information about communication participants and/or their properties, about existing and/or possible communication connections, about communication modules that are used, which may be designed and configured, for example, as software modules or else hardware modules. Communication data in relation to the communication within an automation system may furthermore, for example, also comprise information about spatial arrangements of communication components and information about a network topology that is present. Communication data in relation to the communication within an automation system may, for example, comprise those data that are normally recorded and stored in the context of an engineering system for automation systems in the context of communication planning.

In the event that the configuration datasets of the communication database comprise information about a spatial arrangement of network components and/or a network topology, the communication data vectorization module of the vectorization components may, for example, be configured such that at least some of the vectorized configuration datasets have a two-dimensional vector format or else a higher-dimensional vector format.

The configuration datasets of the communication database and/or the draft configuration dataset may furthermore comprise software data in relation to a software configuration of the associated automation system. Furthermore, the vectorization component may comprise a software data vectorization module for structuring and adjusting the software data.

Software data in relation to a software configuration of an automation system may comprise, for example, one or more control programs, program modules, functional modules or comparable software components for the automation system. Here, the programs may be present, for example, in program languages typical for automation, such as KOP, FUP, or AWL, or in generally more common programming languages, such as Python, Java, C or C++. Here, corresponding program components may be present as source code or else in a compiled version (for example, "binaries"). The software data may furthermore comprise information about, for example, functions present or contained in the framework of the one or more control programs, such as binary logic, value operations, time and/or counter functions, comparison functions, conversion functions, displacement and/or rotation functions, mathematical functions, program control functions or comparable functions. The software data may furthermore also comprise additional information in relation to such functionalities.

Software data in relation to a software configuration of an automation system may furthermore also, for example, be settings for particular compiler procedures for such software, for simulation environments, software diagnosis and/or comparable information in relation to software present in the automation system.

The software data vectorization module of the vectorization component may furthermore, for example, be configured to perform preparation and/or vectorization functions, for example in relation to a control program. Here, the software data vectorization module may, for example, be configured to execute what are known as Natural Language Processing (NLP) methods. Here, NLP methods may, for example, be implemented such as are also used, for example, for the vectorization of text in speech processing or text or text content recognition by neural networks.

Furthermore, at least one of the configuration datasets of the configuration database and/or the draft configuration dataset may comprise HMI data in relation to a configuration of display devices of the associated automation system. Furthermore, the vectorization component may comprise an HMI data vectorization module for structuring and adjusting the HMI data.

In this case, Human Machine Interface (HMI) data are understood to mean those data that relate to the input and/or output data for one or more users of a system. Here, data may be output, for example, via optical output devices (for example, a screen, display, monitor, touch display, LED) and/or acoustic output devices (for example, a speaker). Data may be input for example via a keyboard, mouse, touch surface, joystick, camera or comparable devices.

In this case, HMI data may, for example, comprise information about, for example, a display or about data to be output by a display device (for example, "tags"), information about the way in which data to be output are depicted (for example, information for depicting "face plates"), information for arranging information on a display device or a display, or else comparable information. Furthermore, HMI data may also comprise information about the recording, depiction and interpretation of data that are input or that are to be input.

The HMI data vectorization module may, for example, be configured such that, in the context of the vectorization of HMI data, the vectorized HMI data at least partly have a two-dimensional or higher-dimensional data structure. HMI data that correspond to image data and/or layout data or comparable data may thus, for example, be created, for example, as two-dimensional vectorized HMI data by the HMI data vectorization module.

The structuring and adjustment of the data by the HMI data vectorization module, the software data vectorization module, the communication data vectorization module and/or the hardware data vectorization module may furthermore, for example, be configured in accordance with the present invention.

There may furthermore be provision for the hardware data vectorization module, the communication data vectorization module, the HMI data vectorization module and/or the software data vectorization module to be coupled to at least one other of the data vectorization modules of the vectorization components.

Here, the abovementioned at least one other data vectorization module may again, for example, be the hardware data vectorization module, the communication data vectorization module, the HMI data vectorization module and/or the software data vectorization module of the vectorization component.

By virtue of coupling two or more of the vectorization modules, data that are vectorized within different vectorization modules can be compared with one another, for example, in order, for example, to obtain a uniform depiction of such related or identical data within a corresponding vectorized configuration dataset. Furthermore, redundancies in relation to such data within a vectorized configuration dataset can thus be reduced or avoided.

Thus, for example, by virtue of coupling the hardware data vectorization module to the communication data vectorization module, data describing one and the same communication interface can be compared and, for example, standardized in terms of their vectorization. Further data, linked to the respective interface data, of the respective configuration datasets may thus furthermore also be compared and correlated with one another via the corresponding vectorization modules. A comparable comparison may occur, for example, between data of a control program in relation to the output of data, HMI data in relation to the output of particular data and/or hardware data in relation to particular output and/or input devices (for example, a resolution of a corresponding display or information in relation to corresponding input functionalities).

It is also an object of the invention to provide a method for training an assistance system in accordance with the present invention, which comprises selecting a configuration dataset from the configuration database, converting the configuration dataset into a vectorized configuration dataset using the vectorization component, inputting the vectorized configuration dataset into the neural network of the AI component of the assistance system, and training the neural network with the vectorized configuration dataset using the deep learning method.

In this case, the configuration dataset, the vectorized configuration dataset, the vectorization component, the AI component, the deep learning method and the training of the neural network may be configured in accordance with the present invention.

The neural network may furthermore comprise an auto-encoder structure in accordance with the present invention or can be configured as an auto-encoder structure in accordance with the present invention. Here, the neural network may then be trained such that the parameters of the network nodes and node connections are each adjusted such that data of the vectorized configuration dataset that are input at an input of the encoding region of the auto-encoder structure are again present at an output of the decoding region of the auto-encoder structure or at least approximately present again.

Here, the auto-encoder structure and the training of the neural network may furthermore be configured in accordance with the present invention. Due to the fact that the neural network is trained such that data input at the input of the encoding region are virtually reproduced at the output of the decoding region, the neural network virtually learns the "identity function" in the region of the auto-encoder structure.

It is a further object of the invention to provide a method for assisting the planning of an automation system using an assistance system in accordance with the present invention, where the method comprises inputting a draft configuration dataset for the automation system, converting the draft configuration dataset into a vectorized draft configuration dataset using the vectorization component, inputting the vectorized draft configuration dataset into the neural network of the AI component of the assistance system, and determining a recommended configuration dataset from the configuration database by evaluating the response of the neural network to the input vectorized draft dataset.

Here, the draft configuration dataset, the vectorized draft configuration dataset, the vectorization component, the neural network, the AI component and the recommended configuration dataset may be configured in accordance with the present invention.

The evaluation of the response of the neural network may be or comprise, for example, analysis of the parameters and/or activation parameters of nodes of the neural network following inputting of the vectorized draft configuration dataset. The evaluation of the response of the neural network may comprise for example determination of a location within the neural network that corresponds to the input draft configuration dataset. The determination of a location and the location itself may in this case be configured in accordance with the present invention.

Furthermore, for example in relation to data of the draft configuration dataset, respectively associated data of the recommended configuration dataset and/or a deviation from respectively associated data of the recommended configuration dataset and/or data from the recommended configuration dataset that supplement data of the draft configuration dataset may then be output to a user of the assistance system.

Here, the data output to a user may, for example, be configured in accordance with the present invention. In particular, said data may be output following the determination of the recommended configuration dataset.

In one advantageous embodiment, the neural network may, for example, comprise an auto-encoder structure in accordance with the present invention, where the recommended configuration dataset may furthermore be determined such that a draft location of the draft configuration dataset in the code region of the neural network is determined, and the recommended configuration dataset from the configuration database is determined using locations of the configuration datasets of the configuration database in the code region of the neural network.

Here, the determination of the recommended configuration dataset from the configuration database, the draft location of the draft configuration dataset in the code region of the neural network, the determination of this draft location and/or the use of locations of the configuration datasets of the configuration database to determine the draft location may be configured in accordance with the present invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below by way of example with reference to the accompanying figures, in which.

DETAILED DESCRIPTION OF THE EXEMPLARY EMBODIMENTS

Figure 1:
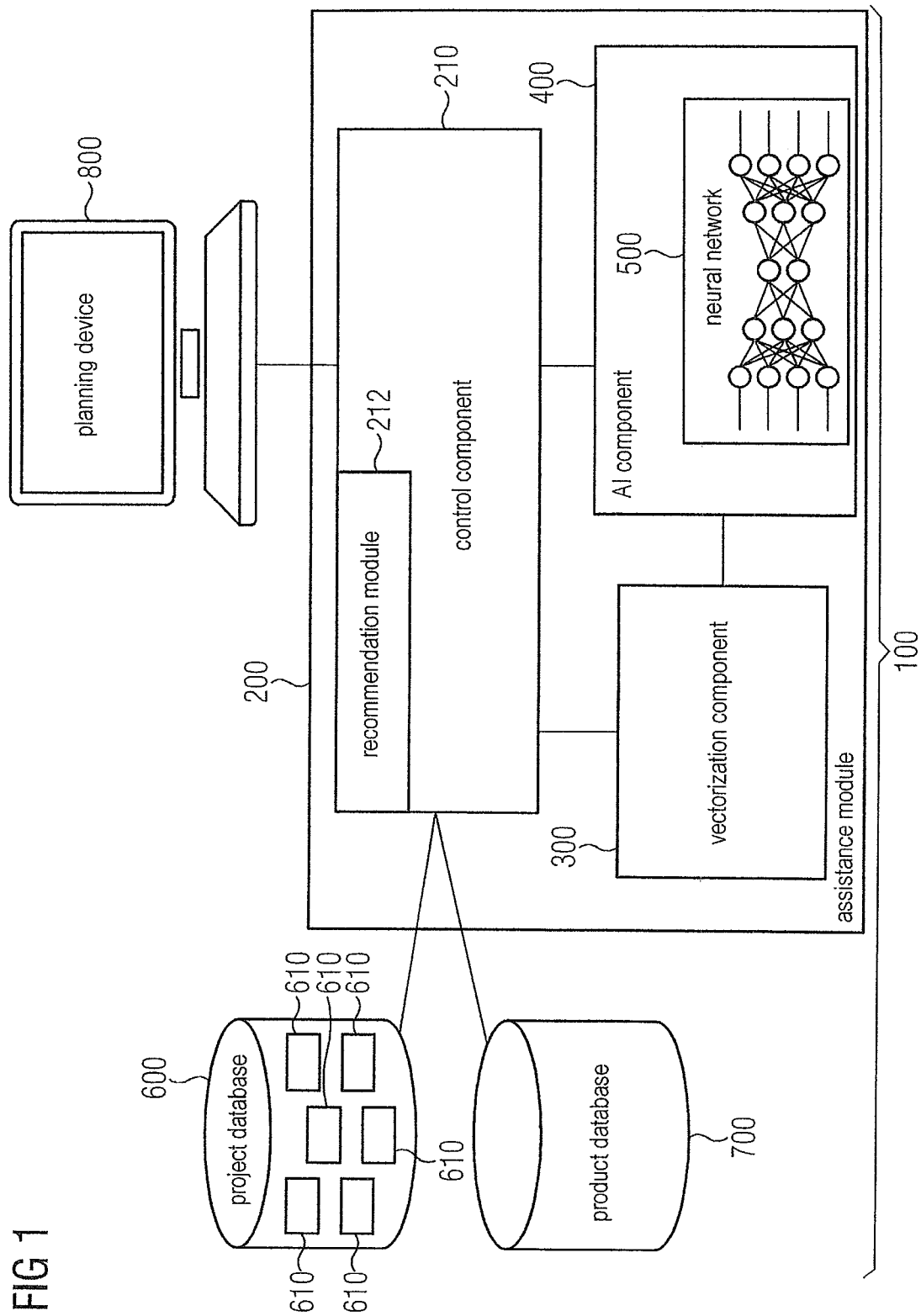
FIG. 1 shows an exemplary assistance system having a planning device for an automation system in accordance with the invention.

FIG. 1 shows an assistance system 100 for a planning device 800 for automation systems, where the assistance system 100 comprises an assistance module 200 and a project database 600.

The assistance module 200 in this case comprises an AI component 400, which comprises a neural network 500, which has a deep learning structure. To prepare or vectorize data for subsequent processing by the AI component 400, the assistance module 200 furthermore comprises a vectorization component 300, which obtains data from a control component 210 of the assistance module 200. The data forwarded from the control component 210 to the vectorization component 300 and from there to the AI component 400 are typically configuration data for an automation system (which is not illustrated in FIG. 1), which the control component may obtain from the planning device 800, for example.

The planning device may in this case be configured, for example, as an "engineering system", such as is normally used to configure automation systems.

Configuration data for the AI component 400 may furthermore also reach the AI component 400 from the project database 600 via the control component 210 and the vectorization component 300. Here, the project database 600 comprises configuration datasets 610, six instances of which are illustrated by way of example in FIG. 1. The configuration datasets 610 each comprise configuration data that have been used in the context of operating particular automation systems.

Here, the assistance module 200 may, for example, have a training operating state in which, for example, a configuration dataset 610 from the project database 600 is routed to the neural network 500 of the AI component 400 via the control component 210 and the vectorization component 300, and the neural network 500 is trained with this configuration dataset 610. In this case, the neural network 500 may have or comprise, for example, an "auto-encoder structure" that may be configured in accordance with the present, for example.

The auto-encoder structure of the neural network 500 may in this case then be trained such that the vectorized configuration dataset 610 from the project database 600 is input at the input of the auto-encoder structure of the neural network 500, and corresponding parameters of nodes and node connections of the auto-encoder structure are then adjusted such that the data output at an output of the auto-encoder structure of the neural network 500 correspond to the input data, or at least approximately correspond thereto. This procedure for training such an auto-encoder structure may furthermore be configured in accordance with the present, for example. Such training of the neural network 500 may then, for example, occur for all of the configuration datasets 610 of the project database, after which a correspondingly trained neural network 500 is then present in the AI component 400.

Such a trained neural network 500 within the AI component 400 may then be used to determine recommendations for configurations of automation systems. This may, for example, occur such that a user of the planning device 800 inputs a configuration into the planning device 800 for a particular intended automation system. These configuration data are then transmitted from the planning device 800 to the assistance module 200 and fed there to the control component 210. In a recommended operating state of the assistance module 200, the control component may then feed these input configuration data to the vectorization component 300, which then creates a configuration data vector (corresponds to the vectorized configuration data in accordance with the present invention) from the specified configuration data. This is explained in even more detail in the context of the later figures. The configuration data vector is then supplied to the AI component 400, and input, inter alia, into the neural network 500 of this AI component 400.

A configuration dataset 610 of the project database 600 is then, for example, determined using the neural network, where the configuration dataset is similar or comparable to the input configuration data. This item of information is transmitted back to the control component 210 by the AI component 400. The control component 210 then takes the configuration data of the determined configuration dataset 610 from the project database 600 and can then use a recommendation module 212 to determine recommendations for configuration data for the planning device 800, which the control component 210 then outputs to the planning device 800. These recommendations may then be output or displayed to a user, for example, via a display device of the planning device.

Corresponding configuration datasets processed by the assistance module 200, for example, configuration datasets 610 from the project database 600 may, for example, comprise information in relation to hardware components of the respective automation system, for which the configuration datasets were respectively created. Such data may be, for example, product IDs, order numbers, product names or similar product-descriptive data. The assistance module may then furthermore be configured, for example, to output order information or further product information in relation to such hardware components to the planning device, or to directly trigger an order to a corresponding product supplier (not illustrated in FIG. 1) using these data.

To this end, the control component 210 of the assistance module 200 is connected to a product database 700, via which the control component 210 can then retrieve the product information necessary to order a particular hardware component. The control component 210 may thus, for example, be configured such that, for a particular configuration dataset, those hardware components are determined in relation to which information is present within the configuration dataset (these hardware components are generally also parts of the automation system on which the configuration dataset is based). There may then, for example, be provision for an order for these hardware components to be triggered through a corresponding user input, for example, in the planning device 800 or directly on the assistance module 200. To this end, the control component 210 then determines the necessary order information in relation to the corresponding hardware components from the product database 700, and transmits this to a supplier for ordering purposes.

Figure 2:
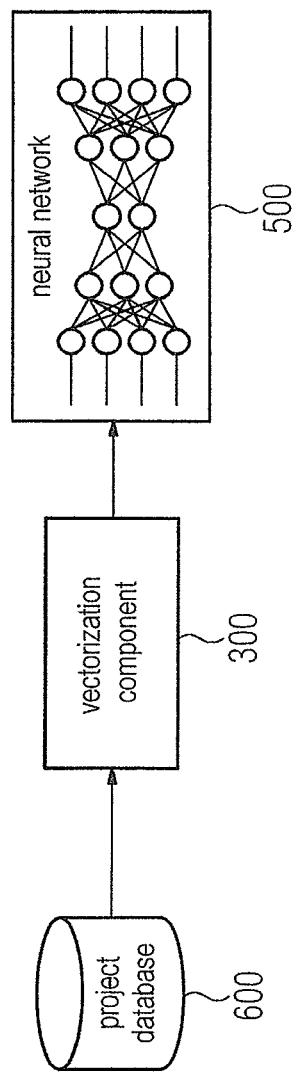
FIG. 2 shows an exemplary sequence for the training of an exemplary neural network for an assistance system in accordance with the invention.

FIG. 2 illustrates a selection of components from FIG. 1 that essentially interact in the training of the neural network 500, for example, in the context of a training state in accordance with the present invention. To train the neural network 500 of the AI component 400 (see FIG. 1), a configuration dataset 610 from the project database 600 is thus, for example, transmitted to the vectorization component 300 of the assistance module 200 (see FIG. 1), and a configuration data vector is created by the vectorization component 300. This is described by way of example in even more detail with reference to FIG. 5. This configuration data vector is then supplied to the neural network 500 of the AI component 400.

In one advantageous embodiment, the neural network is formed as what is known as an auto-encoder structure or comprises such an auto-encoder structure. Corresponding auto-encoder structures or neural networks may be configured, for example, in accordance with the present. To train the neural network 500 having the auto-encoder structure, the configuration data vector is input into the neural network 500 and the parameters of the corresponding network nodes of the auto-encoder structure are in the process determined such that the data input at the input of the auto-encoder structure are reproduced again at the output of the auto-encoder structure, or are at least approximately reproduced again. This sequence may be further configured, for example, in accordance with the present invention. This procedure may then thus occur with all of the configuration datasets 610 of the project database 600. The neural network 500 is then configured as a trained neural network 500 that can then be used, for example, to determine recommendations for configuration data.

Figure 3:
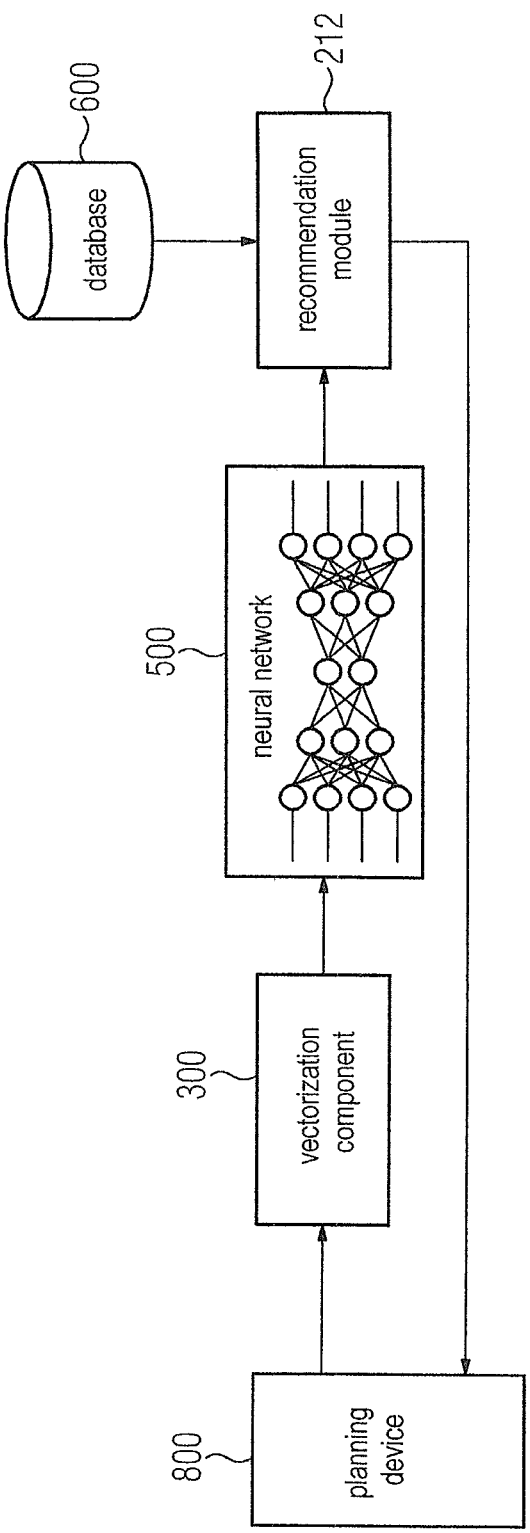
FIG. 3 shows an exemplary sequence for the generation of recommendations by an assistance system in accordance with the invention.

FIG. 3 illustrates a selection of components from FIG. 1, which essentially interact in the derivation of such recommendations for configuration data. With reference to FIG. 3, creation of such a recommendation is described by way of example below. Here, a user of the planning device 800 creates, for example, a draft for a configuration of an automation system to be configured and transmits these data to the vectorization component 300 of the assistance system 200. The draft created by the user for the configuration is in this case an example of a draft configuration dataset in accordance with the present invention. These draft configuration data are then converted into a corresponding draft configuration data vector by the vectorization component 300 and fed to the neural network 500 of the AI component 400 of the assistance system 200.

Depending on the configuration or the structure of the neural network 500, the response of the neural network 500 is then accordingly determined and output to the recommendation module 212 of the assistance system 200. If the neural network 500 is configured, for example, as an auto-encoder structure or comprises such, the determination of the response of the neural network 500 may consist, for example, of the determination of a location in a code region of the neural network 500 or comprise the determination of such a location. This location may then be output, for example, to the recommendation module 212, either on its own or in connection with other data.

In the cited example of using an auto-encoder structure in the neural network 500, there may furthermore be provision for the configuration datasets 610 from the project database 600 to likewise have already been assigned locations in the code region of the auto-encoder structure of the neural network 500. The location determined for the draft configuration data may then be compared with the known locations of the configuration data 610 of the project database 600 by the recommendation module 212. Here, locations of configuration datasets 610 from the database 600 may then, for example, be determined that are adjacent to the location that corresponds to the draft configuration data. This procedure may also be configured in accordance with the present invention, for example. The recommendation module 212 may thus, for example, determine a location nearest the location of the draft configuration dataset, then determine the configuration dataset 610 from the project database 600 that corresponds to this location, and then request this configuration dataset 610 from the project database 600. These data are then transmitted from the project database 600 to the recommendation module 212. This configuration dataset transmitted to the recommendation module is one example of a recommended configuration dataset.

Recommendations for the planning device 800 may then, for example, be formulated in various ways.

In a first recommended way, the recommendation module may, for example, select the corresponding data from the configuration dataset 610 of the project database 600 in each case in relation to particular configuration data of the input configuration draft. This corresponding configuration dataset 610 from the project database 600 is referred to below as "recommended configuration dataset 610". These corresponding data are then transmitted to the planning device 800 and, for example, displayed on a screen of the planning device, such as spatially adjacent to the originally input data. A user of the planning device can thus, for example, recognize what has been used in a comparable automation system for configuration data, so as then, for example, to recognize similarities and differences. He thus obtains assistance in the planning of the configuration of the current automation system, and is thus able to establish more easily where possible error sources in the existing configuration could be.

The recommendation module 212 may furthermore also determine differences between the configuration data of the current draft and the corresponding data of the recommended configuration dataset 610. Such values may then, for example, be transmitted to the planning device that characterize this difference and that can then be depicted spatially adjacent to the corresponding configuration data of the current draft, in connection with the corresponding configuration data, such as on a display device of the planning device 800. A user can thus, for example, recognize relatively easily where differences lie between his current configuration and a comparable configuration of a comparable automation system. In particular, if the database 600 stores only or at least mainly configuration datasets 610 that constitute executable or functioning configurations for particular automation systems, then the user can thus relatively easily discover indications of error sources that could impair the functionality of the current draft of the configuration data within the corresponding automation system.

There may furthermore also be provision for the recommendation module 212 to compare data of the draft configuration dataset with those of the determined recommended configuration dataset 610, and furthermore to determine data from the recommended configuration dataset 610 that do not correspond or that are not assigned to any data in the draft configuration dataset, and then to transmit these data to the planning device 800, where the data is then depicted on a corresponding display device. This may occur, for example, in the context of an input mask, typical for such engineering systems 800, for particular data. Here, a corresponding input mask may be, for example, partially filled in with the draft configuration data, where data fields into which no data have been input by the user are still free. After determination of the recommended configuration dataset 610, the data that correspond to the fields of the input mask that are still empty may then be determined by the recommendation module, for example. The data corresponding to these fields are then determined from the recommended configuration dataset 610 and transmitted to the planning device 800 or the engineering system 800, where these values are then displayed in the correspondingly associated fields of the input mask. This may be considered, for example, to be completion of an input mask or of a configuration dataset.

Figure 4:
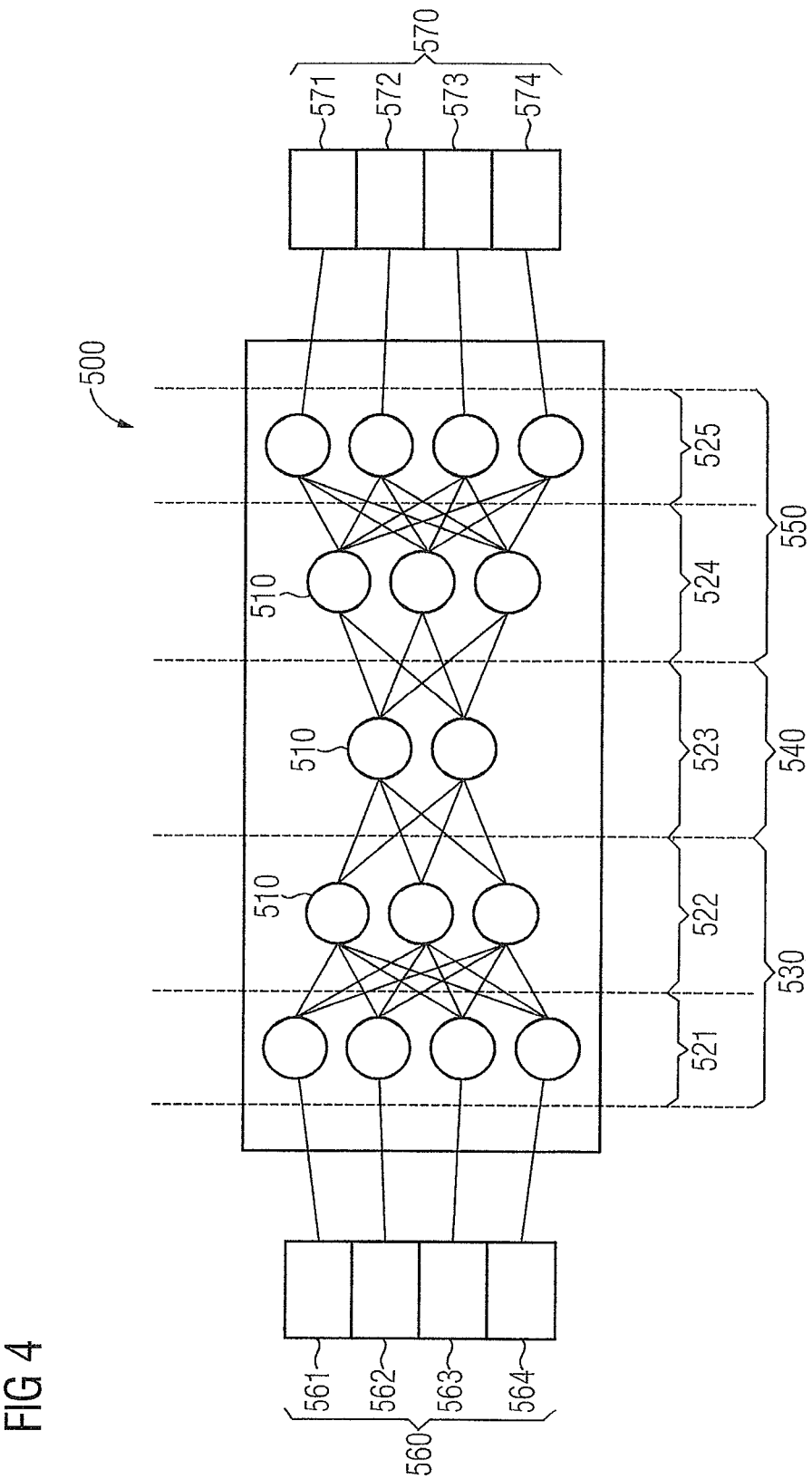
FIG. 4 shows an exemplary structure of a neural network for an assistance system in accordance with the invention.

FIG. 4 illustrates an example of an auto-encoder structure of a neural network 500, where comparatively few nodes have been depicted so as to simplify the illustration of the structure of the auto-encoder 500, and a two-dimensional neural network 500 has been selected for illustrative purposes.

The auto-encoder 500 has what are known as nodes 510, which are structured in five node layers 521, 522, 523, 524, 525 in the illustrated example. These node layers 521, 522, 523, 524, 525 are illustrated as superimposed nodes 510 in FIG. 4. Only some of the nodes 510 are identified using a reference sign in FIG. 4, so as to simplify the illustration. An input data vector 560 having four data fields 561, 562, 563, 564 is illustrated on the left in FIG. 4, where a respective input field 561, 562, 563, 564 is connected to a node 510 of the first node layer 521 of the auto-encoder 500, and data are thus input into the auto-encoder 500. The auto-encoder 500 comprises what is known as an encoding region 530 that comprises the first two node layers 521, 522 of the auto-encoder 500. Here, each of the nodes of the first node layer 521 is connected to each of the nodes of the second node layer 522.

A code region 540, which consists of a node layer 523, adjoins the encoding region 530. Here, each node of the second layer 522 of the encoding region 530 is in turn connected to each node of the code layer 523 of the code region 540.

Adjoining the code region 540, the auto-encoder structure has a decoding region 550, which in turn consists of two node layers 524, 525. The latter of the node layers 525 is in turn connected to data fields 571, 572, 573, 574 of an output data vector 570.

The auto-encoder 500 may then, for example, be trained such that an input dataset 560 is input into the first node layer 521 of the encoding region 530 and the parameters of the nodes and node connections of the auto-encoder 500 are then adjusted, using one of the learning methods applicable to or typical for auto-encoders, such that the output data vector 570 that is output by the last node layer 525 of the decoding region 550 corresponds to the input data vector 560, or at least approximately corresponds to the input data vector 560. Such typical learning methods are, for example, the "backwards propagation of errors" ("back propagation") method, conjugated gradient methods, a "restricted Boltzmann machine" mechanism, or comparable mechanisms or combinations thereof. Parameters of a neural network that are determined during training may be, for example, a weighting of a node connection or of an input value for a node ("weight"), a bias value for a node ("bias"), an activation function for a network node or parameters of such an activation function (for example "sigmoid function", "logistic function", "activation function", etc.) and/or an activation threshold for a network node or comparable parameters.

The learning method described above for the auto-encoder 500 illustrated in FIG. 4 is one example of what is known as "unsupervised learning".

The neural network 500, illustrated in FIG. 1, of the AI component 400 may, however, also comprise a network structure for supervised learning. By way of example, network structures for supervised learning and unsupervised learning may also be combined within the neural network 500 of the AI component 400 according to FIG. 1. By way of example, the neural network 500, illustrated in FIG. 1, of the AI component 400 could comprise an auto-encoder structure, as is illustrated, for example, in FIG. 4, and/or a plurality of further network structures. Here, the auto-encoder structure may deviate from the example of an auto-encoder structure 500 illustrated in FIG. 4, both in terms of the number of nodes respectively involved and the dimensionality of the node layers, and in terms of the number of node layers.

The auto-encoder structure illustrated in FIG. 4 is one example of what is known as a deep auto-encoder 500, because not all of the nodes of the auto-encoder 500 are connected to an input or output of the auto-encoder structure 500, and there are thus "hidden layers".

Very generally speaking, auto-encoder structures may have, for example, a structure symmetrical with respect to the code region. Here, for example, the number of nodes per node layer may furthermore decrease from the input side toward the code region, in each case layer-by-layer, and then increase toward the output side, again layer-bylayer. The layer or layers in the code region thus then has a minimum number of nodes in the context of the auto-encoder structure. The auto-encoder 500 illustrated in FIG. 4 is one example of such a symmetrical auto-encoder as described above.

Figure 5:
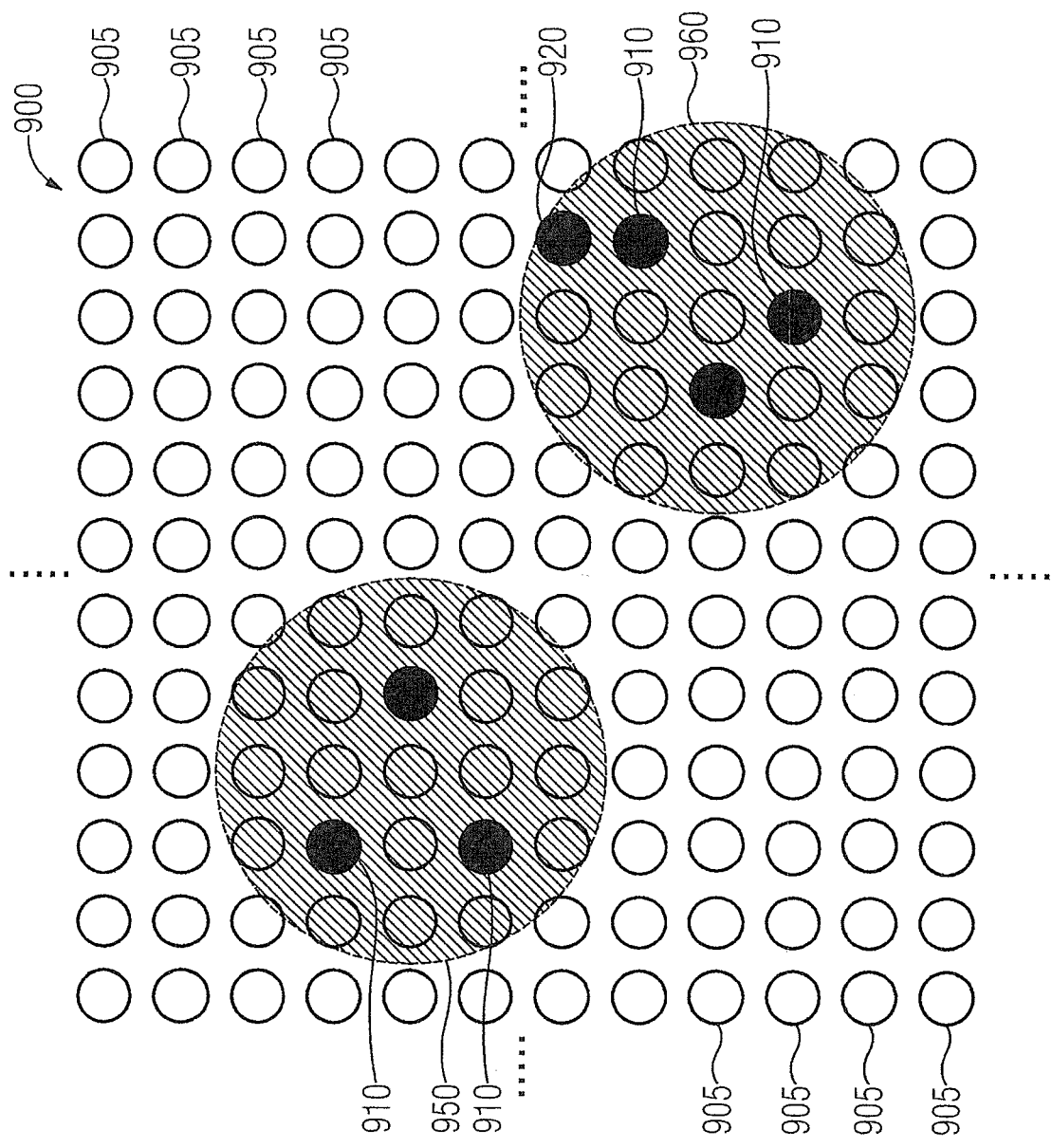
FIG. 5 shows an example of a code region of an auto-encoder neural network within an assistance system in accordance with the invention.

FIG. 5 shows an example of a code layer 900 of an auto-encoder structure having two-dimensional node levels. Here, FIG. 5 shows just a section of the code layer 900, which is in each case symbolized by dots at the edges of the illustrated code layer 900. The code layer 900 comprises nodes 905, only some of which are provided with a reference sign in FIG. 5 for the sake of clarity. Possible connections between nodes 905 of the code layer 900 are not depicted in FIG. 5. Nodes 905 of the code layer 900 may therefore be connected to other nodes 905 of the code layer 900, or may not be connected to any other nodes 905 of the code layer 900.

In one preferred embodiment, the nodes 905 of the code layer 900 are not connected to one another, but rather just to nodes of adjacent node levels (such adjacent node levels are not illustrated in FIG. 5).

Some of the nodes 905 of the code layer 900 are marked in black in FIG. 5 and constitute locations 910 of configuration datasets 610 of the project database 600 according to FIG. 1. In FIG. 5, in this case, a location 910 is in each case symbolized as a specific network node 905. For the sake of clarity, not all of the locations 610 marked in black in FIG. 5 are provided with a reference sign.

To determine a location 910 for a particular configuration dataset 610 from the project database 600, this configuration dataset 610 may, for example, be converted into a configuration vector via the vectorization component 300, and the configuration vector may be input into a neural network having an auto-encoder structure, where the code level 900 in FIG. 5 then constitutes the code region of this auto-encoder. After the input of this configuration vector into the auto-encoder, one or more nodes 905 in the code layer 900 of the code region of the auto-encoder are then activated. If only one node is activated in this case, then this node constitutes the corresponding location 910 that is assigned to the input configuration dataset 610. If a plurality of network nodes are activated, then the location 910 is determined, for example, as a focal point, a geometric or spatial center or similar characteristic region or location for the activated nodes of the code layer 900. The corresponding node 905 in FIG. 5 then constitutes the location 910 that is assigned to the input configuration dataset 610.

To determine a recommended dataset in accordance with the present invention in relation to a particular draft dataset in accordance with the present invention, the draft dataset may, for example, again be converted into a draft configuration vector by the vectorization component 300 (see, for example, FIG. 1), where the draft configuration vector is then input into the neural network 500 (see, for example, FIG. 1) having the auto-encoder structure, which has the code node layer 900 illustrated in FIG. 5. A corresponding draft location 920 in the code layer 900 of the auto-encoder is then determined for example in accordance with the procedure explained above.

To determine a corresponding recommended configuration, that location 910 in relation to the configuration datasets 610 in the code layer 900 that lies closest to the draft location 920 may then be determined, for example. In FIG. 5, this is the node 910 lying directly below the draft location 920. The configuration dataset 610 from the project database 600 associated with this location 910 may then be output to a user as a recommended configuration dataset or be used by a user for further processing.

As an alternative, for example, a plurality of nearest locations 910 may also be determined for the draft location 920, and the corresponding configuration datasets may then be output to a user or used for further processing.

FIG. 5 furthermore illustrates a first cluster region 950 and a second cluster region 960, where each of the cluster regions 950, 960 is assigned to a cluster of locations 910 within the code layer 900. If, for example, a neighborhood of locations 910 in the code layer 900 corresponds to a similarity of the corresponding configuration datasets 610 or to the draft location 920, then each of the cluster regions 950, 960 then corresponds to a certain type of configuration dataset 610 or to a certain type of automation system on which these configuration datasets 610 are each based. Here, the first cluster region 950 is then, for example, assigned a first automation system type and the cluster region 960 is assigned a second automation system type. When determining the recommended configuration dataset by way of determining the recommended location 920, it is also then possible, for example, to output, along with the one or more recommended configuration datasets 610, the item of information that the underlying draft configuration dataset and/or the one or more recommended configuration datasets 610 are assigned to the second automation system type, as may be seen from the example illustrated in FIG. 5.

The cluster regions 950, 960 may be determined, for example, after determining the locations 910 of the configuration datasets 610 through corresponding cluster recognition methods (methods such as, for example, what is known as a k-nearest-neighbor method or comparable methods). After such a determination of the clusters 950, 960, several or all of the locations 910 associated with a particular cluster 950, 960 may furthermore be used to produce a "standard configuration dataset" typical for the respective cluster region 950, 960 or else a "template configuration dataset", via the correspondingly associated configuration datasets.

This may occur, for example, in that, by comparing corresponding data of the various configuration datasets associated with a cluster, such as the value or the data element that is most prevalent in the datasets is respectively selected. In the case of numerical data, an average value of the corresponding data of the various configuration datasets may furthermore also, for example, be used as a value in the template configuration dataset. In addition, a particular data element in the template configuration dataset may also be generated through a manual selection by a user from the corresponding data of the individual configuration datasets.

The illustrated procedures may then, for example, also be combined as desired in order to generate the template configuration dataset. There may furthermore also be provision for the template configuration dataset to comprise just some of the information necessary to configure an automation system. It is also possible for a draft configuration dataset to be assigned to not just one but rather a plurality of locations 910.

After determining the location of the draft configuration dataset 920, it may then also be determined and communicated, for example, that this draft location is associated with the second cluster region 960. The template configuration dataset corresponding to the second cluster region 960 may then subsequently, for example, be retrieved and also, for example, output to a user.

Figure 6:
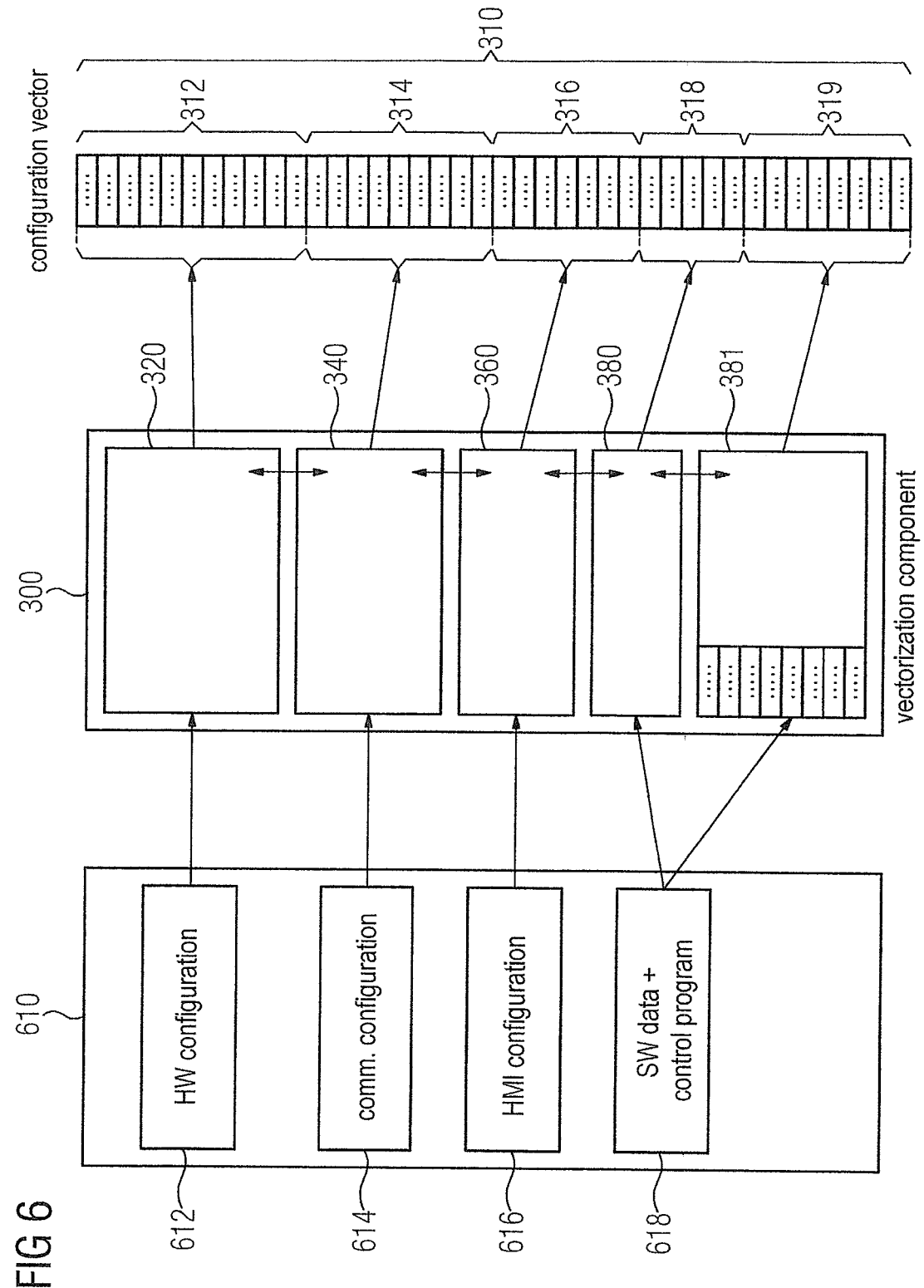
FIG. 6 shows an exemplary structure and sequence for the generation of an example of a configuration vector from a configuration dataset within an assistance system in accordance with the invention.

FIG. 6 shows an exemplary refinement of the vectorization component 300 according to FIGS. 1, 2 and/or 3 in connection with a corresponding exemplary refinement of the configuration dataset 610 according to FIG. 1. Here, the configuration dataset 610 comprises a hardware configuration data block 612 that comprises hardware data for the associated automation system. Here, the hardware data may, for example, be configured in accordance with the present invention. The configuration dataset 610 furthermore comprises a communication configuration data block 614 that comprises communication data for the associated automation system. Here, the communication data may be configured in accordance with the present invention. The configuration dataset 610 also comprises an HMI configuration data block 616, which comprises HMI data in relation to the configuration of user interfaces of the associated automation system. Here, the HMI data may likewise again be configured in accordance with the present invention. The configuration dataset 610 furthermore comprises a software data block 618, which comprises information in relation to the implemented software, its parameters and/or one or more control programs for the associated automation system. Here, the software data and the control programs may likewise again be configured in accordance with the present invention.

A configuration vector 310 is then generated via the vectorization component 300 from the configuration dataset 610, where the configuration vector is then used for the input into the AI component 400 and/or the neural network 500 of the AI component 400 (see, for example, FIG. 1 for the illustration of these components). The configuration vector 310 again has a hardware data region 312, a communication data region 314, an HMI data region 316 and a first software data region 318 and a second software data region 319. Here, the first software data region 318 is assigned information in relation to the software that is used (for example, a firmware state, an operating system type, or a software configuration, software modules that are present), whereas the second software data region 319 of the configuration vector 310 is provided for vectorized data from one or more control programs for the automation system.

The vectorization component 300 then comprises a hardware data vectorization module 320 that is configured to convert data of the hardware configuration block 612 of the configuration dataset 610 into the vectorized hardware data 312 of the configuration vector 310.

The vectorization component accordingly comprises a communication data vectorization module 340 that is configured to convert data from the communication data block 614 of the configuration dataset 610 into corresponding vectorized communication data 314 of the communication vector 310.

The vectorization component 300 also comprises an HMI data vectorization module 360, via which data of the HMI configuration data block 616 of the configuration dataset 610 are converted into correspondingly vectorized HMI configuration data 316 of the configuration vector 310.

The vectorization component furthermore comprises a software data vectorization module 380 and a program code vectorization module 381. Here, the software data vectorization module 380 is used to convert data from the software data block 618 of the configuration dataset 610 that contain information in relation to the software used within the automation system into corresponding software data 318 of the configuration vector 310.

The program code of one or more control programs for the corresponding automation system is converted into the corresponding vectorized program code data 319 of the configuration vector via the program code vectorization module 381. This is illustrated in FIG. 6 such that the individual program sections of a control program are represented by small boxes within the program code vectorization module 381, which are then converted into the correspondingly vectorized control program data 319, for example, using what are known as natural language processing (NLP) methods and/or using speech, text or information recognition methods. Here, the program code vectorization module 381 may, for example, likewise comprise a neural network or neural network components. The other vectorization modules 320, 340, 360 and 380 may also accordingly comprise neural network structures.

It is furthermore symbolized in FIG. 6, by arrows between the various vectorization modules 320, 340, 360, 380, 381, that the vectorization modules 320, 340, 360, 380, 381 of the vectorization component 300 are each configured to communicate in each case with other ones of the vectorization modules 320, 340, 360, 380, 381. Such communication between the individual modules 320, 340, 360, 380, 381 may, for example, be used to vectorize logically related data from the various data blocks 612, 614, 616, 618 of the configuration dataset 610 in an accordingly standardized or coordinated manner.

By virtue of this, it is quite generally possible, inter alia, for the configuration vector 310 to contain entries including a combination of data from a plurality of data blocks 612, 614, 616, 618 of the configuration dataset 610.

Thus, data in relation to a particular communication interface may be present both in the hardware configuration data block 612 and in the communication configuration data block 614, for example, which data are then accordingly able to be compared via the communication between the hardware vectorization module 320 and the communication data vectorization module 340 and vectorized in a standardized manner (for example, in the context of the vectorization, may be provided with a standardized identifier or reference). Accordingly, in relation to input and/or output data for the automation system, information may be present both within the HMI configuration data block 616 and the software data block 618 of the configuration dataset, for example, which information may then accordingly again be compared for vectorization purposes through communication of the corresponding vectorization modules 360, 380, 381. Data in relation, for example, to a particular depiction of values to be input or output may be present, for example, in the HMI configuration data block 616 and in the hardware configuration data block 612 (for example, in relation to a particular input or output device) of the configuration dataset 610. In this case, the data may also be compared or also coordinated in the context of the vectorization through communication of the corresponding vectorization modules 360, 320.

Figure 7:
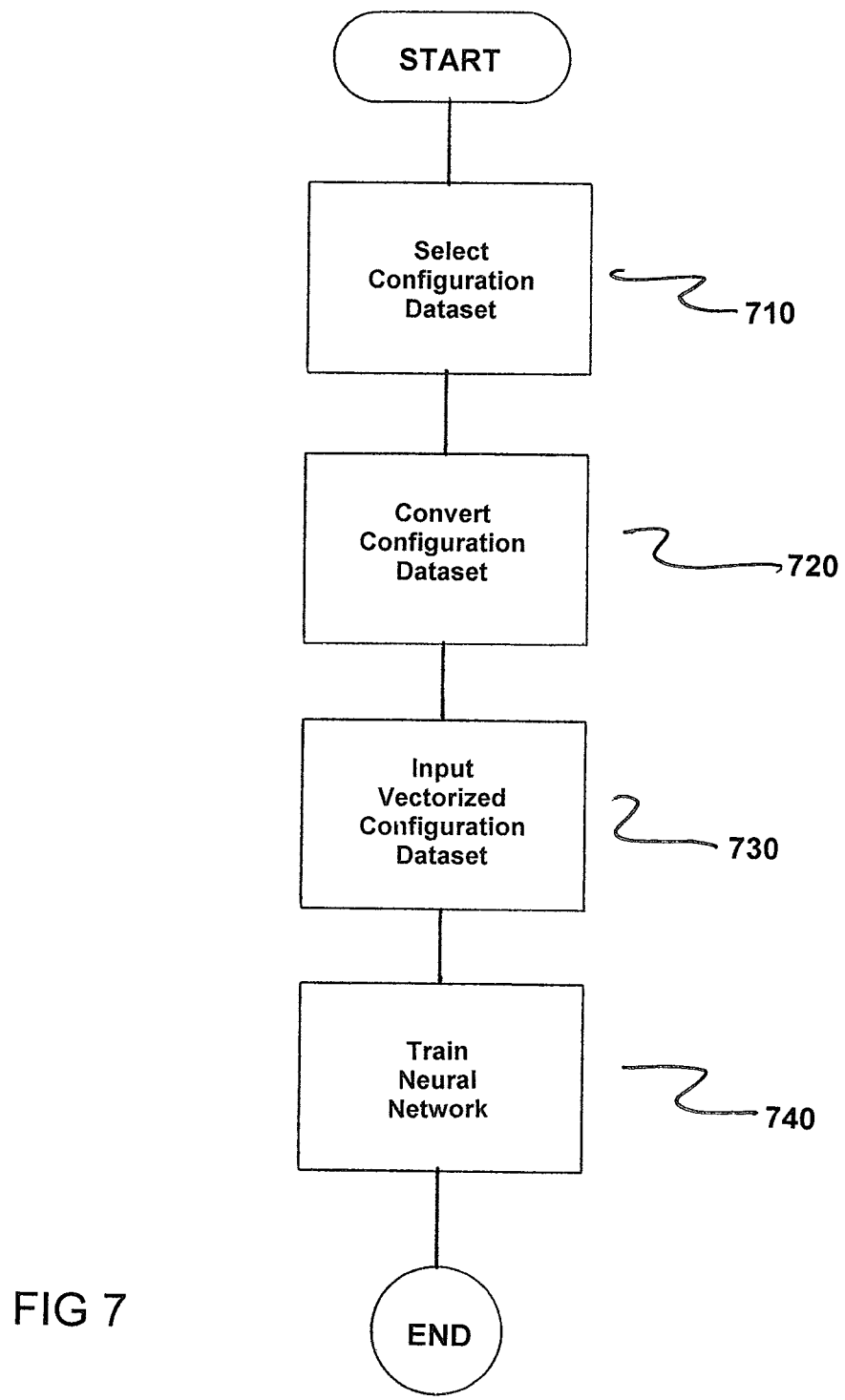
FIG. 7 is a flowchart of the method in accordance with the invention.

FIG. 7 is a flowchart of the method for training an assistance system in accordance with the invention. The method comprises selecting a configuration dataset 610 from the configuration database 600, as indicated in step 710. Next, the configuration dataset 610 is converted into a vectorized configuration dataset 310 using the vectorization component 300, as indicated in step 720.

The vectorized configuration dataset 310 is now input into a neural network 500 of an AI component 400 of the assistance system (100, as indicated in step 730. The neural network 500 is now trained with the vectorized configuration dataset 310 using a deep learning method, as indicated in step 740.

Figure 8:
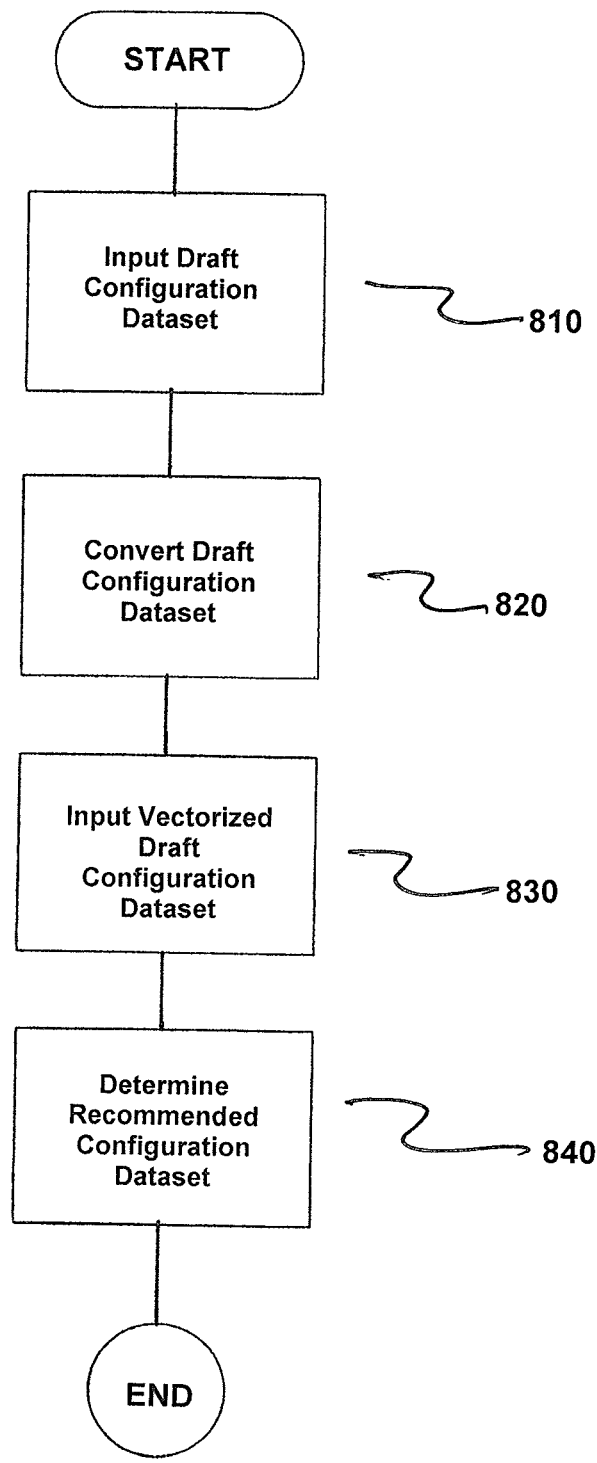
FIG. 8 is a flowchart of the method in accordance with an alternative embodiment of the invention.

FIG. 8 is a flowchart of the method for assisting planning of an automation system using an assistance system 100 in accordance with the invention. The method comprises inputting a draft configuration dataset for the automation system, as indicated in step 810. Next, the draft configuration dataset is converted into a vectorized draft configuration dataset using the vectorization component 300, as indicated in step 820.

Next, the vectorized draft configuration dataset is input into the neural network 500 of an AI component 400 of the assistance system 100, as indicated in step 830. A recommended configuration dataset 610 is now determined from a configuration database 600 by evaluating a response of the neural network 500 to the input vectorized draft configuration dataset, as indicated in step 840.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An assistance system which assists in planning layouts and configurations of automation systems prior to operation of said automation systems, comprising:
    a computer having a processor and memory;
    a configuration database comprising configuration datasets of automation systems, a respective configuration dataset in each case comprising configuration data of a predefined automation system;
    a vectorizer for structuring and adjusting configuration datasets, the vectorizer converting the configuration datasets of the configuration database into vectorized configuration datasets comprising at least one of (i) normalization of data and/or values; (ii) creation of a numerical representation of data, (iii) chaining of ordered data sequences and/or of related data from various sources, (iv) formation of values that describe or combine data and (v) conversion of time series into the frequency domain and/or conversion of frequency series into the time domain;
    an artificial intelligence (AI) component for processing the vectorized configuration datasets utilizing artificial intelligence;
    wherein the processing of the vectorized configuration datasets by the AI component comprises utilizing a neural network having a deep learning architecture during planning of the layouts and configurations of the automation systems via the assistance system prior to operation of said automation systems.

2. The assistance system as claimed in claim 1, wherein the neural network is configured as a trained neural network in which training of the neural network has been performed at least partly with vectorized configuration datasets taken from the configuration database.

3. The assistance system as claimed in claim 1, wherein the assistance system is configured to execute a training operating state in which the neural network is trained with a deep learning method utilizing vectorized configuration datasets taken from the configuration database.

4. The assistance system as claimed in claim 2, wherein the assistance system is configured s to execute a training operating state in which the neural network is trained with a deep learning method utilizing vectorized configuration datasets taken from the configuration database.

5. The assistance system as claimed in claim 1, wherein the assistance system is configured to execute a recommended operating state, in which a draft configuration dataset is supplied to the assistance system, said draft configuration dataset being converted into a vectorized draft configuration dataset via the vectorizer; and wherein the assistance system determines a recommended configuration dataset from the configuration database therefrom utilizing the neural network.

6. The assistance system as claimed in claim 5, wherein in relation to data of the draft configuration dataset, at least one of (i) respectively associated data of the recommended configuration dataset, (ii) a deviation from respectively associated data of the recommended configuration dataset and (iii) data from the recommended configuration dataset that supplement data of the draft configuration dataset are output by the assistance system.

7. The assistance system as claimed in claim 5, wherein the assistance system is configured to at least one of (i) create a result configuration dataset utilizing the draft configuration dataset and recommended configuration dataset and (ii) store a recommended configuration dataset created using the draft configuration dataset and recommended configuration dataset, and configured to determine hardware components associated with the result configuration dataset, and configured to determine order information associated with the particular hardware components.

8. The assistance system as claimed in claim 6, wherein the assistance system is configured to at least one of (i) create a result configuration dataset utilizing the draft configuration dataset and recommended configuration dataset and (ii) store a recommended configuration dataset created using the draft configuration dataset and recommended configuration dataset, and configured to determine hardware components associated with the result configuration dataset, and configured to determine order information associated with the particular hardware components.

9. The assistance system as claimed in claim 5, wherein configuration datasets of the configuration database are each assigned an assessment characteristic variable, and a recommended assessment assigned to the recommended configuration dataset is output by the assistance system.

10. The assistance system as claimed in claim 9, wherein the assistance system is configured to determine a draft assessment of the draft configuration dataset utilizing the assessment characteristic variables of the configuration datasets of the configuration database.

11. The assistance system as claimed in claim 1, wherein the neural network includes an auto-encoder structure; and wherein the auto-encoder structure has an encoding region, a code region coupled thereto and a decoding region connected to said code region.

12. The assistance system as claimed in claim 11, wherein the auto-encoder structure is configured such that a location in the code region of the neural network is assigned or is assignable to a configuration dataset of the configuration database.

13. The assistance system as claimed in claim 11, wherein a draft location of the draft configuration dataset in the code region of the neural network is determined, and a recommended configuration dataset is determined from the configuration database utilizing locations of configuration datasets of the configuration database in the code region of the neural network.

14. The assistance system as claimed in claim 12, wherein a draft location of the draft configuration dataset in the code region of the neural network is determined, and a recommended configuration dataset is determined from the configuration database utilizing locations of configuration datasets of the configuration database in the code region of the neural network.

15. The assistance system as claimed in claim 12, wherein the locations of configuration datasets of the configuration database in the code region of the neural network are furthermore assigned to at least one cluster region; wherein the assistance system is furthermore configured to determine a cluster standard configuration dataset from configuration datasets assigned to a cluster region.

16. The assistance system as claimed in claim 13, wherein the locations of configuration datasets of the configuration database in the code region of the neural network are furthermore assigned to at least one cluster region; wherein the assistance system is furthermore configured to determine a cluster standard configuration dataset from configuration datasets assigned to a cluster region.

17. The assistance system as claimed in claim 1, wherein at least one of (i) at least one of the configuration datasets of the configuration database and (ii) the draft configuration dataset comprises hardware data in relation to hardware devices of the associated automation system, and the vectorizer further comprises a hardware data vectorizer for structuring and adjusting the hardware data.

18. The assistance system as claimed in claim 1, wherein at least one of (i) at least one of the configuration datasets of the configuration database and (ii) the draft configuration dataset comprises communication data in relation to the communication within the associated automation system, and the vectorizer further comprises a communication data vectorizer for structuring and adjusting the communication data.

19. The assistance system as claimed in claim 1, wherein at least one of (i) at least one of the configuration datasets of the configuration database and (ii) the draft configuration dataset comprises software data in relation to a software configuration of the associated automation system, and the vectorizer further comprises a software data vectorizer for structuring and adjusting the software data.

20. The assistance system as claimed in claim 1, wherein at least one of (i) at least one of the configuration datasets of the configuration database and (ii) the draft configuration dataset comprises Human Machine Interface (HMI) data in relation to a configuration of display devices of the associated automation system, and the vectorizer further comprises an HMI data vectorizer for structuring and adjusting the HMI data.

21. The assistance system as claimed in claim 17, wherein at least one of (i) the hardware data vectorizer, (ii) the communication data vectorizer, the HMI data vectorizer and (ii) the software data vectorizer is coupled to at least one other of the data vectorizers of the vectorizer.

22. A method of training an assistance system which is utilized during planning of layouts and configurations of automation systems prior to operation of said automation systems, comprising:
selecting a configuration dataset from a configuration database;
converting the selected configuration dataset into a vectorized configuration dataset using a vectorizer, said dataset comprising at least one of (i) normalization of data and/or values; (ii) creation of a numerical representation of data, (iii) chaining of ordered data sequences and/or related data from various sources, (iv) formation of values that describe or combine data and (v) conversion of time series into the frequency domain and/or conversion of frequency series into the time domain;

inputting the vectorized configuration dataset into a neural network of an artificial intelligence (AI) component of the assistance system; and training the neural network of the assistance system with the vectorized configuration dataset using a deep learning method, said neural network being utilized during planning of the layouts and configurations of the automation systems prior to the operation of said automation systems.

23. The method as claimed in claim 22, wherein the neural network comprises an auto-encoder structure one of (i) having an encoding region, a code region coupled thereto and a decoding region connected to said code region and (ii) configured such that a location in the code region of the neural network is assigned or is assignable to a configuration dataset of the configuration database, and the neural network is trained such that the data of the vectorized configuration dataset input at an input of the encoding region are again present at an output of the decoding region.

24. A method of assisting planning a layout and configuration of an automation system using an assistance system prior to operation of said automation system, comprising:

inputting a draft configuration dataset for the automation system prior to operation of the automation system;

converting the draft configuration dataset into a vectorized draft configuration dataset using a vectorizer, said data set comprising at least one of (i) normalization of data and/or values; (ii) creation of a numerical representation of data, (iii) chaining of ordered data sequences and/or of related data from various sources, (iv) formation of values that describe or combine data and (v) conversion of time series into the frequency domain and/or conversion of frequency series into the time domain;

inputting the vectorized draft configuration dataset into a neural network of an artificial intelligence (AI) component of the assistance system, said neural network being utilized during the planning of the layout and configuration of the automation system prior to operation of said automation system; and determining a recommended configuration dataset from a configuration database by evaluating a response of the neural network of the AI component of the assistance system to the input vectorized draft configuration dataset.

25. The method as claimed in claim 24, wherein in relation to data of the draft configuration dataset, at least one of (i) respectively associated data of the recommended configuration dataset, (ii) a deviation from respectively associated data of the recommended configuration dataset (iii) and data from the recommended configuration dataset that supplement data of the draft configuration dataset are output.

26. The method as claimed in claim 25, wherein the neural network comprises an auto-encoder structure, and the recommended configuration dataset from the configuration database is furthermore determined such that a draft location of the draft configuration dataset in the code region of the neural network is determined, and the recommended configuration dataset from the configuration database is determined using locations of the configuration datasets of the configuration database in a code region of the neural network.

* * * * *